(12) United States Patent
Yoon et al.

(10) Patent No.: US 10,772,478 B2
(45) Date of Patent: Sep. 15, 2020

(54) ROBOT CLEANER

(71) Applicant: LG ELECTRONICS INC., Seoul (KR)

(72) Inventors: Sungho Yoon, Seoul (KR); Jeongseop Park, Seoul (KR); Jihyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 191 days.

(21) Appl. No.: 16/057,572

(22) Filed: Aug. 7, 2018

(65) Prior Publication Data
US 2019/0150692 A1    May 23, 2019

(30) Foreign Application Priority Data

Aug. 7, 2017  (KR) .................. 10-2017-0099752

(51) Int. Cl.
*A47L 11/16* (2006.01)
*A47L 11/293* (2006.01)
(Continued)

(52) U.S. Cl.
CPC ............. *A47L 11/4011* (2013.01); *A47L 9/28* (2013.01); *A47L 11/161* (2013.01);
(Continued)

(58) Field of Classification Search
CPC ........ A47L 9/28; A47L 11/161; A47L 11/185; A47L 11/293; A47L 11/305;
(Continued)

(56) References Cited

U.S. PATENT DOCUMENTS 2,988,762 A    6/1961   Babcock
5,998,953 A   12/1999   Nakamura et al.
(Continued)

FOREIGN PATENT DOCUMENTS

EP    1 762 165    3/2007
EP    3 138 459    3/2017
(Continued)

OTHER PUBLICATIONS

European Search Report dated Nov. 16, 2018 issued in EP Application No. 18187634.3.
(Continued)

*Primary Examiner* — Randall E Chin
(74) *Attorney, Agent, or Firm* — KED & Associates, LLP

(57) ABSTRACT

A robot cleaner includes a cleaning module having a left spin-mop and a right spin-mop configured to contact a floor while rotating in a clockwise direction or in a counterclockwise direction when viewed from above. The robot cleaner also includes a controller that manages the cleaning module such that, when the robot cleaner travels in a zigzag pattern including a first travel, during which the robot cleaner travels straight in a first direction, and a second travel, during which the robot cleaner travels straight in a second direction, which is opposite the first direction, a movement trajectory of the left spin-mop or the right spin-mop during the second travel overlaps a movement trajectory of the left spin-mop and a movement trajectory of the right spin-mop during the first travel.

20 Claims, 17 Drawing Sheets

(51) Int. Cl.
| | | |
|---|---|---|
| A47L 11/40 | (2006.01) | |
| A47L 9/28 | (2006.01) | |
| A47L 11/30 | (2006.01) | |
| A47L 11/18 | (2006.01) | |
| B25J 11/00 | (2006.01) | |
| G05D 1/02 | (2020.01) | |

(52) U.S. Cl.
CPC ........... *A47L 11/185* (2013.01); *A47L 11/293* (2013.01); *A47L 11/305* (2013.01); *A47L 11/4038* (2013.01); *A47L 11/4041* (2013.01); *A47L 11/4066* (2013.01); *B25J 11/0085* (2013.01); *G05D 1/0223* (2013.01); *A47L 2201/04* (2013.01); *G05D 2201/0215* (2013.01)

(58) Field of Classification Search
CPC .............. A47L 11/4011; A47L 11/4038; A47L 11/4041; A47L 11/4066; A47L 2201/04
See application file for complete search history.

(56) References Cited

U.S. PATENT DOCUMENTS

| | | | |
|---|---|---|---|
| 2004/0143927 A1 | 7/2004 | Haegermarck et al. | |
| 2004/0181896 A1* | 9/2004 | Egawa | G05D 1/0219 15/319 |
| 2005/0015913 A1 | 1/2005 | Kim et al. | |
| 2006/0185690 A1 | 8/2006 | Song et al. | |
| 2007/0051757 A1 | 3/2007 | Lim et al. | |
| 2008/0276407 A1 | 11/2008 | Schnittman et al. | |
| 2011/0202175 A1 | 8/2011 | Romanov et al. | |
| 2012/0168971 A1 | 7/2012 | Hansen et al. | |
| 2012/0169497 A1* | 7/2012 | Schnittman | A47L 9/2826 340/540 |
| 2012/0222706 A1 | 9/2012 | Pears et al. | |
| 2014/0196247 A1 | 7/2014 | Kasper | |
| 2014/0259478 A1 | 9/2014 | Conrad | |
| 2015/0182090 A1 | 7/2015 | Park et al. | |
| 2015/0223653 A1 | 8/2015 | Kim et al. | |
| 2017/0147000 A1 | 5/2017 | Hoennige et al. | |
| 2018/0242810 A1 | 8/2018 | Jang et al. | |

FOREIGN PATENT DOCUMENTS

| | | |
|---|---|---|
| JP | H10-211132 | 8/1998 |
| JP | 2014-014455 | 1/2014 |
| JP | 2014-137694 | 7/2014 |
| JP | 2015-163153 | 9/2015 |
| KR | 20-1988-0011603 | 8/1998 |
| KR | 10-0241620 | 4/2000 |
| KR | 10-2005-0012047 | 1/2005 |
| KR | 20-0395016 | 9/2005 |
| KR | 10-0661339 | 12/2006 |
| KR | 20-0437646 | 12/2007 |
| KR | 10-0814507 | 3/2008 |
| KR | 10-2008-0040761 | 5/2008 |
| KR | 10-0835968 | 6/2008 |
| KR | 10-2008-0081626 | 9/2008 |
| KR | 10-0871114 | 11/2008 |
| KR | 10-2010-0076134 | 7/2010 |
| KR | 10-1026003 | 3/2011 |
| KR | 20-0458863 | 3/2012 |
| KR | 10-2012-0069845 | 6/2012 |
| KR | 10-1152720 | 6/2012 |
| KR | 10-1164291 | 7/2012 |
| KR | 10-2012-0129185 | 11/2012 |
| KR | 10-1323597 | 11/2013 |
| KR | 10-1338143 | 12/2013 |
| KR | 10-2014-0011216 | 1/2014 |
| KR | 10-1369220 | 3/2014 |
| KR | 10-2014-0060450 | 5/2014 |
| KR | 10-1487778 | 1/2015 |
| KR | 10-2015-0014351 | 2/2015 |
| KR | 10-1495866 | 2/2015 |
| KR | 10-2015-0057959 | 5/2015 |
| KR | 10-1519685 | 5/2015 |
| KR | 10-2015-0073726 | 7/2015 |
| KR | 10-2015-0078094 | 7/2015 |
| KR | 10-2015-0095469 | 8/2015 |
| KR | 10-1543490 | 8/2015 |
| KR | 10-1544667 | 8/2015 |
| KR | 10-2015-0139111 | 12/2015 |
| KR | 10-1578879 | 12/2015 |
| KR | 10-1602790 | 3/2016 |
| KR | 10-1622740 | 5/2016 |
| KR | 10-2016-0090567 | 8/2016 |
| KR | 10-2016-0090571 | 8/2016 |
| KR | 10-1654014 | 9/2016 |
| KR | 10-1678443 | 12/2016 |
| KR | 10-2017-0049532 | 5/2017 |
| KR | 10-2017-0124216 | 11/2017 |
| KR | 10-2018-0008250 | 1/2018 |

OTHER PUBLICATIONS

Korean Office Action dated Jan. 22, 2019 issued in KR Application No. 10-2017-0099763.
Korean Office Action dated Nov. 29, 2018 issued in KR Application No. 10-2017-0099758.
Korean Office Action dated Oct. 29, 2019 issued in Application No. 10-2019-0124685.
Korean Office Action dated Jan. 31, 2019 issued in Application No. 10-2018-0009437.
European Search Report dated Nov. 14, 2018 issued in EP Application No. 18187619.4.
European Search Report dated Nov. 14, 2018 issued in EP Application No. 18187630.1.
Korean Office Action dated Nov. 20, 2018 issued in KR Application No. 10-2017-0099752.
Korean Office Action dated Nov. 20, 2018 issued in KR Application No. 10-2017-0099754.
Korean Office Action dated Nov. 21, 2018 issued in KR Application No. 10-2017-0099755.
Korean Office Action dated Nov. 21, 2018 issued in KR Application No. 10-2017-0099756.
Korean Office Action dated Nov. 21, 2018 issued in KR Application No. 10-2017-0099757.
International Search Report dated Dec. 4, 2018 issued in PCT/KR2018/008928.
International Search Report dated Dec. 7, 2018 issued in PCT/KR2018/008922.
International Search Report dated Dec. 10, 2018 issued in PCT/KR2018/008954 (English translation).
U.S. Appl. No. 16/057,394, filed Aug. 7, 2018.
U.S. Appl. No. 16/057,448, filed Aug. 7, 2018.
U.S. Appl. No. 16/057,492, filed Aug. 7, 2018.
U.S. Appl. No. 16/256,435, filed Jan. 24, 2019.
U.S. Appl. No. 16/057,516, filed Aug. 7, 2018.
U.S. Appl. No. 16/057,076, filed Aug. 7, 2018.
U.S. Appl. No. 16/056,971, filed Aug. 7, 2018.
U.S. Appl. No. 16/057,550, filed Aug. 7, 2018.
U.S. Appl. No. 16/057,572, filed Aug. 7, 2018.
International Search Report dated May 22, 2019 issued in PCT/KR2019/001021.
Korean Notice of Allowance dated May 22, 2019 issued in KR Application No. 10-2017-0099753.
United States Office Action dated Apr. 24, 2020 issued in U.S. Appl. No. 16/057,492.
United States Office Action dated Jun. 17, 2020 issued in co-pending related U.S. Appl. No. 16/057,550.
Korean Office Action dated Apr. 22, 2020 issued in KR Application No. 10-2019-0124685.

* cited by examiner

ROBOT CLEANER

CROSS-REFERENCE TO RELATED APPLICATION(S)

This application claims the priority benefit of Korean Patent Application No. 10-2017-0099752, filed on Aug. 7, 2017 in the Korean Intellectual Property Office, the disclosure of which is incorporated herein by reference.

BACKGROUND

1. Field

The present disclosure relates to a robot cleaner capable of performing a mopping operation.

2. Background

A robot cleaner (also referred to as an autonomous cleaner) is an apparatus that autonomously travels and cleans a floor or other surface. The robot cleaner may suction foreign matter, such as dust, from the floor or may sweep away foreign matter on the floor while traveling autonomously. Another type of robot cleaners may clean by performing a mopping operation using a spin-mop. A robot cleaner including a spin-mop may also travel by using the rotation of the spin-mop when cleaning the floor. In addition, water may be supplied to the spin-mop when cleaning the floor.

Korean Registered Patent Publication No. 10-1602790 describes a robot cleaner that travels using rotations of mops. This robot cleaner includes a pair of rotary members that have shafts that are coupled at one end to a pair of mops (or mop heads) that are positioned in a leftward-rightward direction. The shafts extend substantially vertically and are inclined in an outward direction to incline bottom surfaces of the mops. In this robot cleaner, the rotary members are concurrently rotated on a floor surface while portions of the mops fixed to the rotary members are in contact with the floor surface to generate friction forces to move the robot cleaner. However, the respective frictional forces generated between each of the rotating mops and the floor may frequently change, such that the robot cleaner may have difficulty travelling in a straight path. The frictional forces may change, for example, due to differences in the moisture levels in the mops, differences in the material or texture of the floors, differences in amounts or types of foreign substances on the floor or the mops, etc. If the robot cleaner does not travel in a straight path, the robot cleaner cannot reliably move adjacent to a wall or other obstacle having a straight surface, such that the robot cleaner may miss a considerable portion of the floor near the wall and will not wipe this portion of the floor with the mops.

Korean Registered Patent Publication No. 10-1578879 describes another robot cleaner that includes a main body, a driving unit provided in the main body to supply power to move the robot cleaner, first and second rotary members that are rotated, respectively, about first and second rotary shafts by power from the driving unit, and wet cleaners that are fixed to ends of the first and second rotary members. This robot cleaner sequentially rotates the first rotary member and the second rotary member such that the robot cleaner travels in an S-shaped pattern. However, the S-shaped moving pattern provides a travel speed and a cleaning speed that are generally slower in comparison to simultaneously rotating two rotary members to move the robot cleaner. Furthermore, the S-shaped moving patterns may limit an ability of the cleaner to perform certain kinds of motions.

Furthermore, certain robot cleaners, such as automated vacuum cleaners, may use zigzag-pattern travel to minimize uncleaned regions. However, in a robot cleaner that is driven through spin-mops may not clean in a central part of the robot cleaner between the spin mops. As a result, a robot cleaner that is driven through spin-mops may leave uncleaned regions even when the robot cleaner uses the conventional zigzag-pattern travel. Therefore, it is desirable to control a robot cleaner that performs a mopping operation to travel effectively while minimizing uncleaned regions.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to embodiments, examples of which are illustrated in the accompanying drawings. However, the present disclosure may be embodied in many different forms and should not be construed as being limited to the embodiments set forth herein.

In order to clearly and briefly describe the present disclosure, parts that have no connection with the description are omitted from the drawings. Wherever possible, the same reference numbers will be used throughout the specification to refer to the same or like parts. Meanwhile, in the following description, with respect to constituent elements used in the following description, the suffixes "module" and "unit" are used or combined with each other only in consideration of ease in the preparation of the specification, and do not have or indicate mutually different meanings. Accordingly, the suffixes "module" and "unit" may be interchanged with each other.

Meanwhile, a mop (or mop head), which will be mentioned below, may be made of various materials, such as fabric or paper. In addition, the mop may be washable for repeated use or may be disposable. The present disclosure may apply to a cleaner that is manually moved by a user or to a robot cleaner that travels autonomously. Hereinafter, the following discussion describes an embodiment related to a robot cleaner.

Figure 1:
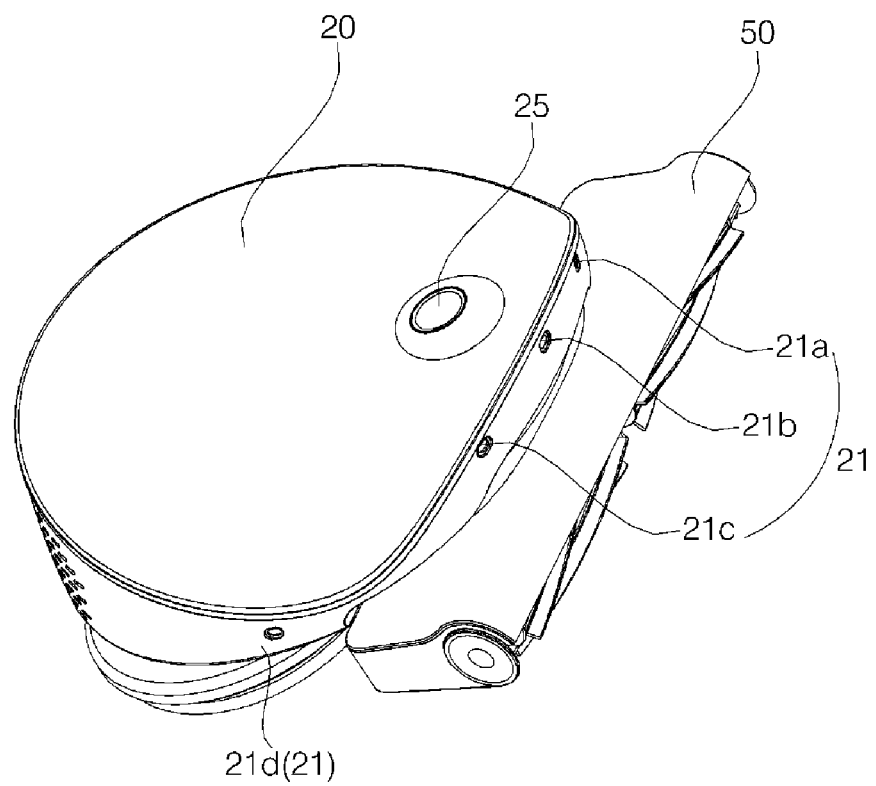
FIG. 1 is a perspective view showing a robot cleaner according to an embodiment of the present disclosure.
Figure 2:
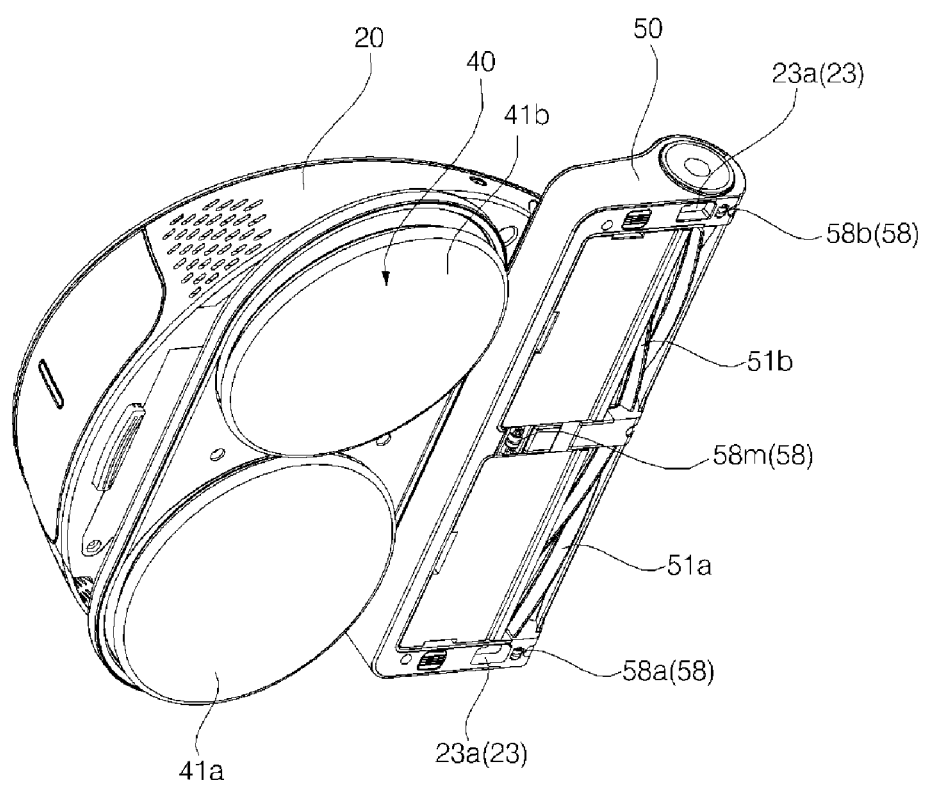
FIG. 2 is a bottom perspective view of the robot cleaner according to the embodiment of the present disclosure.
Figure 3:
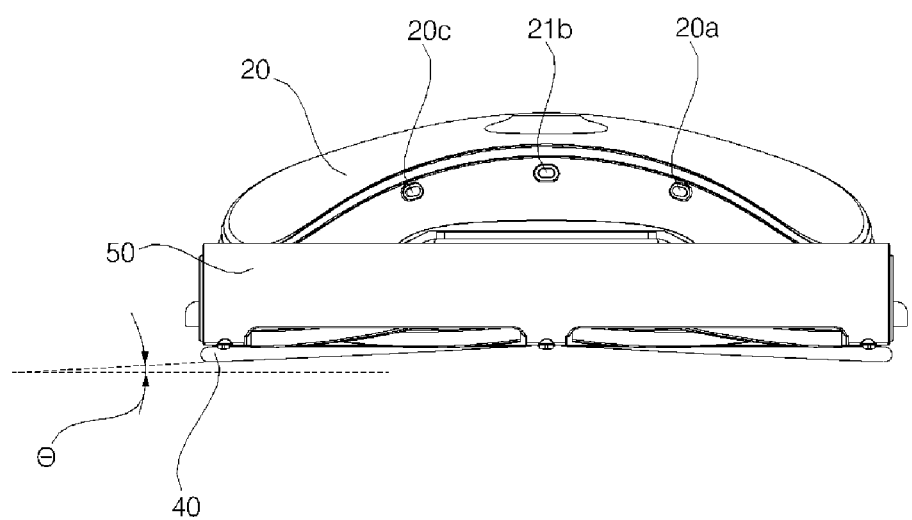
FIG. 3 is a front view of the robot cleaner according to the embodiment of the present disclosure.
Figure 4:
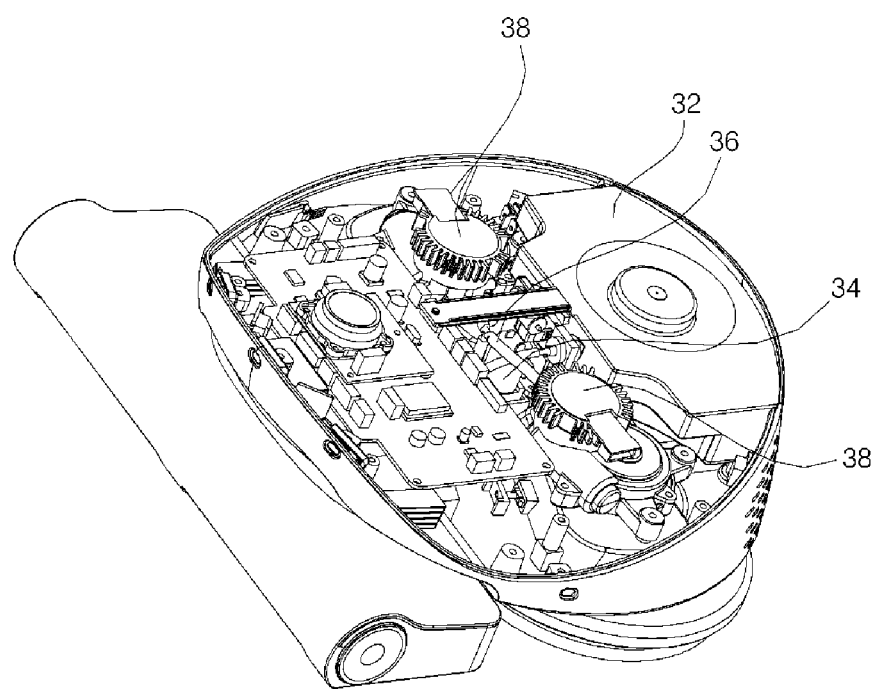
FIG. 4 is a view showing the internal construction of the robot cleaner according to the embodiment of the present disclosure.

FIG. 1 is a perspective view showing a robot cleaner according to an embodiment of the present disclosure, FIG. 2 is a bottom perspective view of the robot cleaner according to the embodiment of the present disclosure, FIG. 3 is a front view of the robot cleaner according to the embodiment of the present disclosure, and FIG. 4 is a view showing the internal construction of the robot cleaner according to the embodiment of the present disclosure.

Referring to FIGS. 1 to 4, a robot cleaner according to the embodiment of the present disclosure includes a main body 20 that defines the external appearance of the robot cleaner. The robot cleaner includes a first cleaning module 40 that supports the main body 20. The robot cleaner may also include a second cleaning module 50 that supports the main body 20. Thus, the main body 20 may be supported by the first cleaning module 40 and the second cleaning module 50.

In one embodiment, the first cleaning module 40 may be referred to as a mop module 40 or a spin-mop module 40 that mop a floor or other surface to be cleaned when mop module 40 is in contact with the floor. The second cleaning module 50 may be referred to as a collection module 50 that collects foreign matter from the floor.

The first cleaning module 40 may be configured to mop the floor when in contact with the floor. The first cleaning module 40 includes a left spin-mop 41a and a right spin-mop 41b configured to mop the floor while rotating in the clockwise direction or in the counterclockwise direction when viewed from above. The left spin-mop 41a and the right spin-mop 41b are configured to contact the floor. The first cleaning module 40 is positioned under the main body 20. The first cleaning module 40 may be positioned at the rear of the second cleaning module 50. The robot cleaner may be configured such that the main body 20 is movable according to the rotation of the first cleaning module 40 without any additional wheels or other movement device.

In one embodiment, the left spin-mop 41a and the right spin-mop 41b are configured to rotate about rotary shafts that extend substantially vertically in the upward-downward direction. The rotational direction or speed of the spin-mops 40 may be changed to control the travel of the robot cleaner.

The robot cleaner according to an embodiment may include the first cleaning module 40 with a pair of spin-mops 41a, 41b to move the main body 20 and a driving motor 38 for driving the spin-mops 41a, 41b. The robot cleaner according to this embodiment may further include a water tank 32 positioned inside the main body 20 to store water, a pump 34 that supplies the water from the water tank 32 to the first cleaning module 40, and a connection hose 36 for interconnecting the pump 34 and the water tank 32 or interconnecting the water tank 32 and the first cleaning module 40. The first cleaning module 40 is configured to mop the floor in a wet state using the water in the water tank 32. The spin-mops 41a and 41b may be configured to mop the floor when in contact with the floor.

The robot cleaner according to this embodiment may further include the second cleaning module 50 that is positioned in front of the first cleaning module 40 to remove foreign matter from the floor before mopping the floor using the spin-mops 40. In another example, the second cleaning module 50 may be positioned behind the first cleaning module 40

The second cleaning module 50 is spaced apart from the first cleaning module 40 in the forward-rearward direction to collect foreign matter from the floor in the state of being in contact with the floor. The second cleaning module 50 may include at least one collection unit (or collection bin) that defines a collection space to receive and store the collected foreign matter. The at least one collection unit may include a pair of collection units.

In addition, the second cleaning module 50 may include sweeping units (or sweeping rollers) 51a and 51b configured to rotate in the state of being in contact with the floor such that foreign matter on the floor is introduced into the collection space.

The sweeping units 51a and 51b are configured to rotate about a rotary shaft that extends in substantially the horizontal direction. The sweeping units 51a and 51b may include blades or brushes positioned in front of the collection units so as to directly contact the floor. The blades of the sweeping units 51a and 51b are configured to sweep the floor such that relatively bulky foreign matter is collected in the collection units.

In another example, the second cleaning module 50 may be configured to mop the floor while sliding on the floor according to the movement of the main body 20. In another example, the second cleaning module 50 may be configured to mop the floor while rotating. For example, the second cleaning module 50 may include a rotating mop that rotates along a rotation axis that extends in a right-left direction. In a further example, the second cleaning module 50 may be configured to perform vacuum cleaning. The following description described the second cleaning module 50 as being configured to perform vacuum cleaning. However, it should be appreciated that type of the detailed construction of the second cleaning module 50 may be changed.

The robot cleaner is configured such that the main body 20 is moved according to the rotation of at least one of the first and second cleaning modules 40 and 50 without any additional driving wheels. For example, the main body 20 may be moved according to the rotation of the first cleaning module 40 alone. The robot cleaner may be configured such that the main body 20 is movable according to the rotation of the spin-mops 41a and 41b without any additional driving wheels.

In one embodiment, the second cleaning module 50 may include an auxiliary wheel 58 configured to contact the floor. The auxiliary wheel may be passive and may not be driven to rotate to move the robot cleaner. The auxiliary wheel 58 stabilize the body 20 to help the robot cleaner move smoothly in the forward-rearward direction, and to prevent the robot cleaner from overturning in the forward-rearward direction. The auxiliary wheel 58 may position the sweeping units 51a and 51b at a certain distance from to the floor such that the sweeping unit 51a and 51b efficiently sweeps the floor.

The auxiliary wheel 58 may include a pair of auxiliary wheels 58a and 58b positioned at left and right sides of the robot cleaner. The left auxiliary wheel 58a is positioned at the left side of the left sweeping unit 51a. The right auxiliary wheel 58b is positioned at the right side of the right sweeping unit 51b. The auxiliary wheels 58a and 58b are positioned in a symmetrical arrangement.

In addition, a middle auxiliary wheel 58m may be provided. The middle auxiliary wheel 58m is positioned between the collection units. The middle auxiliary wheel 58m may be spaced apart from the auxiliary wheels 58a and 58b in the forward-rearward direction.

The robot cleaner may include an obstacle sensor 21 for sensing an obstacle in front of the robot cleaner. The main body 20 may be provided with a plurality of obstacle sensors 21a, 21b, 21c, 21d, and 21e. The obstacle sensor 21 may include front obstacle sensors 21a, 21b, and 21c that detect attributes of an obstacle in front of the robot cleaner and left and right obstacle sensors 21d and 21e for sensing obstacles at left and right sides of the robot cleaner.

The robot cleaner according to one embodiment may include a cliff sensor 23 for sensing if there is a cliff in the floor. The cliff sensor 23 may include a plurality of cliff sensors 23a and 23b. For example, the second cleaning module 50 may be provided at the lower side thereof with cliff sensors 23a and 23b to sense if there is a cliff in the floor. In addition, the second cleaning module 50 may be provided at the rear thereof with a cliff sensor (not shown) that sense if there is a cliff in the floor. The cliff sensors 23a and 23b sense if there is a cliff in a region ahead of the first cleaning module 40.

The robot cleaner may include a camera 25 to capture an external image. The camera 25 may be positioned at the top of the main body 20 to acquire an image of the external environment above the main body 20. The robot cleaner may perform a location recognition operation and a simultaneous localization and mapping (SLAM) operation using the image acquired by the camera 25.

Referring to FIG. 3, the robot cleaner according to an embodiment may be configured such that the spin-mops 41a and 41b are inclined at a predetermined angle θ from the floor. In order to smoothly move the robot cleaner, the entire surfaces of the spin-mops 41a and 41b may not uniformly contact the floor, but the spin-mops 41a and 41b may be inclined at the predetermined angle θ such that only the portions of the surfaces of the spin-mops 41a and 41b contact the floor. Alternatively, the spin-mops 41a and 41b may be positioned such that a frictional force is highest between the portions of the surfaces of the spin-mops 41a and 41b and the floor even when the entire surfaces of the spin-mops 41a and 41b contact the floor.

The lower surface of the left spin-mop 41a and the lower surface of the right spin-mop 41b may be inclined. The lower surface of the left spin-mop 41a is generally inclined downward in the leftward direction, and the lower surface of the right spin-mop 41b is generally inclined downward in the rightward direction. That is, the left spin-mop 41a and the right spin-mop 41b may be inclined upward toward the center of the robot cleaner.

The angle of inclination of the left spin-mop 41a and the angle of inclination of the right spin-mop 41b are acute angles. The angle of inclination may be set to be sufficiently small for the entire lower surfaces of the left spin-mop 41a and the right spin-mop 41b to contact the floor according to the rotation of the left spin-mop 41a and the right spin-mop 41b while the frictional force between the portions of the surfaces of the spin-mops 41a and 41b and the floor is the highest.

Referring to FIG. 3, the lower surface of the left spin-mop 41a is the lowest at the left side thereof, and the lower surface of the left spin-mop 41a is the highest at the right side thereof. The lower surface of the right spin-mop 41b is the lowest at the right side thereof, and the lower surface of the right spin-mop 41b is the highest at the left side thereof.

Figure 5:
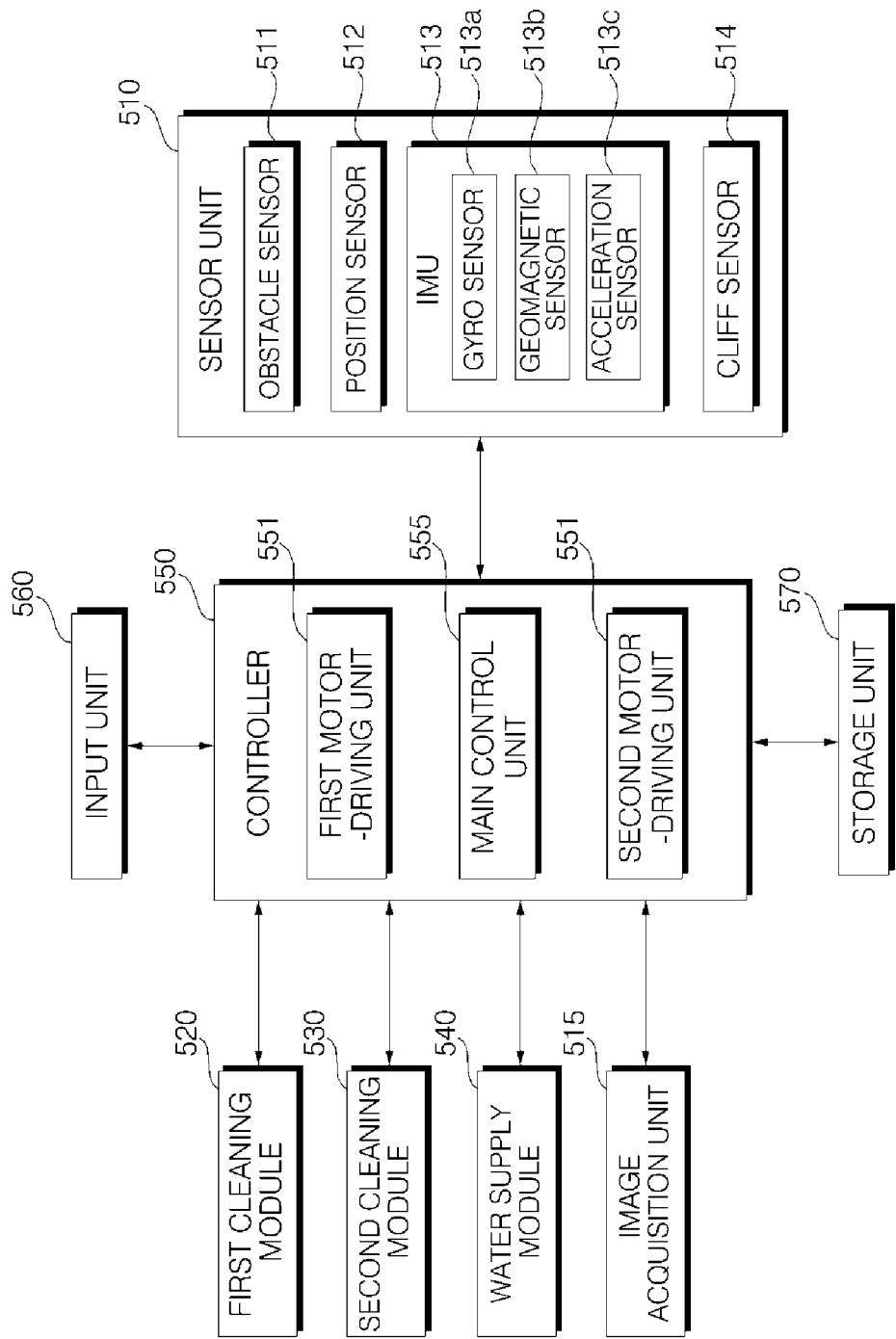
FIG. 5 is a block diagram showing the control relationship between main components of the robot cleaner according to the embodiment of the present disclosure.

FIG. 5 is a block diagram showing the control relationship between main components of the robot cleaner according to the embodiment of the present disclosure. A first cleaning module 520 and a second cleaning module 530 shown in FIG. 5 may correspond to the first cleaning module 40 and a second cleaning module 50, described with reference to FIGS. 1 to 4.

Referring to FIG. 5, the robot cleaner according to one embodiment may include a first cleaning module 520 including a left spin-mop 41a and a right spin-mop 41b configured to contact the floor while rotating in the clockwise direction or in the counterclockwise direction when viewed from above, a second cleaning module 530 including sweeping units 51a and 51b configured to contact the floor while rotating in the clockwise direction or in the counterclockwise direction when viewed from the left side, the second cleaning module 530 being spaced apart from the left spin-mop 41a and the right spin-mop 41b in the forward-rearward direction, and a controller 550 for controlling the overall operation of the robot cleaner.

In one embodiment, the controller 550 may perform control such that, when the robot cleaner travels in a zigzag pattern including a first travel, during which the robot cleaner travels straight in a first direction, and a second travel, during which the robot cleaner travels straight in a second direction, which is opposite the first direction, the movement trajectory of the left spin-mop 41a or the right spin-mop 41b during the second travel overlaps the movement trajectory of the left spin-mop 41a and the movement trajectory of the right spin-mop 41b during the first travel.

Here, the movement trajectory of the left spin-mop 41a and the movement trajectory of the right spin-mop 41b may refer to regions of the floor over which the left spin-mop 41a and the right spin-mop 41b move while contacting the floor. In addition, the movement trajectory of the left spin-mop 41a and the movement trajectory of the right spin-mop 41b may refer to a set of regions of the floor over which the left spin-mop 41a and the right spin-mop 41b move while contacting the floor with a predetermined magnitude of frictional force.

Meanwhile, the robot cleaner according to an embodiment may further include a water supply module (or water supply) 540 for supplying water to the left spin-mop 41a and the right spin-mop 41b. The water supply module 540 may include a water tank 32 positioned inside the main body 20 for storing water, a pump 34 for supplying the water from the water tank 32 to the first cleaning module 40, and a connection hose 36 for interconnecting the pump 34 and the water tank 32 or interconnecting the water tank 32 and the first cleaning module 40.

The robot cleaner according to the embodiment of the present disclosure may travel according to the rotation of the spin-mops 41a and 41b. Alternatively, the robot cleaner according to the embodiment of the present disclosure may travel through front wheels formed in the shape of the sweeping units 51a and 51b and rear wheels formed in the shape of the spin-mops 41a and 41b.

The spin-mops 41a and 41b perform wet cleaning using the received water, and at the same time may generate driving force for travel in a desired direction. The controller 550 may control the rotation of the left spin-mop 41a and the right spin-mop 41b and the rotation of the sweeping units 51a and 51b. In addition, the controller 550 may independently control the spin-mops 41a and 41b and the sweeping units 51a and 51b.

In addition, according to an embodiment, the robot cleaner may perform various travel motions and simultaneously perform both wet and dry cleaning operations based on controlling the rotation directions and speeds of the spin-mops 41a and 41b and the sweeping units 51a and 51b. The controller 550 may control the travel of the robot cleaner by generating motion based on the difference between drag forces caused by the difference in the number of rotations and the frictional forces of the spin-mops 41*a* and 41*b*. Alternatively, the controller 550 may control the travel of the robot cleaner by generating motion based on the difference between drag forces in the state in which the spin-mops 41*a* and 41*b* and the sweeping units 51*a* and 51*b* slide simultaneously or based on the difference between drag forces caused by the difference between the number of rotations and the frictional forces of the spin-mops 41*a* and 41*b* and the sweeping units 51*a* and 51*b*.

Meanwhile, the first cleaning module 520 may include a motor 38 to rotate the spin-mops 41*a* and 41*b*. The motor 38 may include a left motor to rotate the left spin-mop 41*a* and a right motor to rotate the right spin-mop 41*b*.

Meanwhile, the controller 550 may include a first motor-driving unit (or first motor circuitry) 551 to drive the motor 38 for rotating the spin-mops 41*a* and 41*b*. The first motor-driving unit 551 is controlled by a main control unit (or main control circuitry) 555 of the controller 550. The first motor-driving unit 551 drives the motor 38. Consequently, the spin-mops 41*a* and 41*b* are rotated by the motor 38.

The first motor-driving unit 551, which is configured to drive the motor 38, may include an inverter (not shown), an inverter controller (not shown), a current detection unit (not shown) for detecting current flowing in the motor 38, and a voltage detection unit (not shown) for detecting voltage applied to the motor 38. In addition, the first motor-driving unit 551 may further include a converter for supplying direct-current power to be input to the inverter (not shown).

Meanwhile, the second cleaning module 520 may include a motor (not shown) for rotating the sweeping units 51*a* and 51*b*. The controller 550 may include a second motor driving unit (or second motor driving circuitry) 552 to drive the motor. The second motor-driving unit 552 is controlled by the main control unit 555 of the controller 550. The second motor-driving unit 552 drives the motor. Consequently, the sweeping units 51*a* and 51*b* are rotated by the motor.

The second motor-driving unit 552, which is configured to drive the motor, may include an inverter (not shown), an inverter controller (not shown), a current detection unit (not shown) for detecting current flowing in the motor, and a voltage detection unit (not shown) for detecting voltage applied to the motor. In addition, the second motor-driving unit 552 may further include a converter that supplies direct-current power to be input to the inverter (not shown).

The first and second motor-driving units 551 and 552 are shown as being provided in the controller 550 in FIG. 5. However, the present disclosure is not limited thereto. For example, the first and second motor-driving units 551 and 552 may be provided separately outside the controller 550 so as to operate under the control of the controller 550. In addition, the detailed construction of the first and second motor-driving units 551 and 552 may be changed depending on the kind and specification of the motors.

The robot cleaner according to the embodiment of the present disclosure may include a storage unit (or memory) 570 that stores various kinds of data. The storage unit 570, which stores various kinds of information used to control the robot cleaner, may include a volatile or nonvolatile recording medium. The recording medium may store data that can be read by the microprocessor. The recording medium may include a hard disk drive (HDD), a solid-state disk (SSD), a silicon disk drive (SDD), a ROM, a RAM, a CD-ROM, a magnetic tape, a floppy disk, and an optical data storage device. In one embodiment, the storage unit 570 may store cleaning history information that may be created whenever cleaning is performed by the robot cleaner.

The robot cleaner according to the embodiment of the present disclosure may include an input unit (or user interface) 560 that allows a user to input various commands, including a power on/off command. The robot cleaner may receive a user command through the input unit 560.

The robot cleaner according to the embodiment of the present disclosure may include an image acquisition unit (or image sensor) 515 including at least one camera 25. The image acquisition unit 515 captures photographs of a region in which the robot cleaner travels. The image acquisition unit 515 may include a digital camera. The digital camera may include at least one optical lens, an image sensor (for example, a CMOS image sensor) including a plurality of photodiodes (for example, pixels), on which light that has passed through the optical lens forms an image, and a digital signal processor (DSP) for creating an image based on signals output from the photodiodes. The digital signal processor may create not only a still image but also a moving image consisting of still image frames. Meanwhile, the position and photographing range of the camera included in the image acquisition unit 515 may be variously changed depending on the design.

The robot cleaner according to the embodiment of the present disclosure may include a sensor unit (or sensor) 510 including a plurality of sensors that senses various data related to the operation and state of the robot cleaner. For example, the sensor unit 510 may include an obstacle sensor 511 for sensing an obstacle in front of the robot cleaner. The obstacle sensor 511 may include a plurality of obstacle sensors 21*a*, 21*b*, 21*c*, 21*d*, and 21*e*, shown in FIG. 1. The obstacle sensor 511 may include an infrared sensor, an ultrasonic sensor, an RF sensor, a geomagnetic sensor, or a position-sensitive device (PSD) sensor. Meanwhile, the position and kind of the sensor included in the obstacle sensor 511 may be changed based on the type of the robot cleaner. The obstacle sensor 511 may include a greater variety of kinds of sensors.

The controller 550 may perform control such that the robot cleaner travels while evading sensed obstacles. In addition, according to the present disclosure, the controller 550 may adjust the rotational directions and speeds of the left spin-mop 41*a* and the right spin-mop 41*b* in order to control the turning direction and the turning radius of the robot cleaner.

Figure 6A:
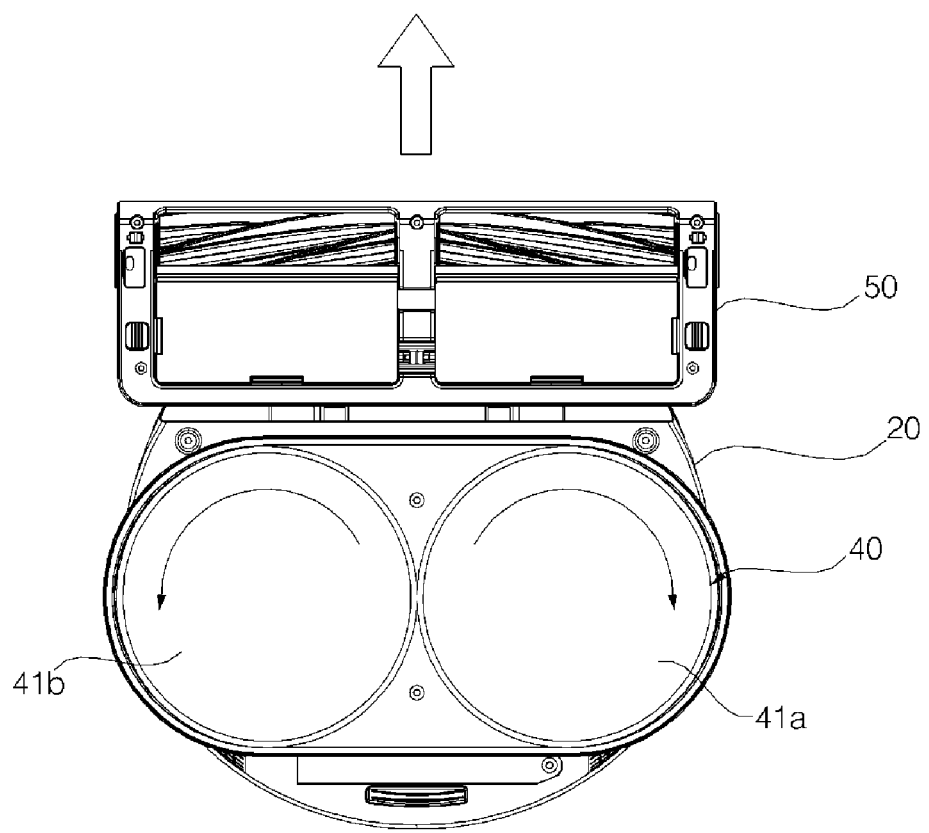
FIGS. 6A to 6C are reference views illustrating the rotation of spin-mops during the travel of the robot cleaner according to the embodiment of the present disclosure.
Figure 6B:
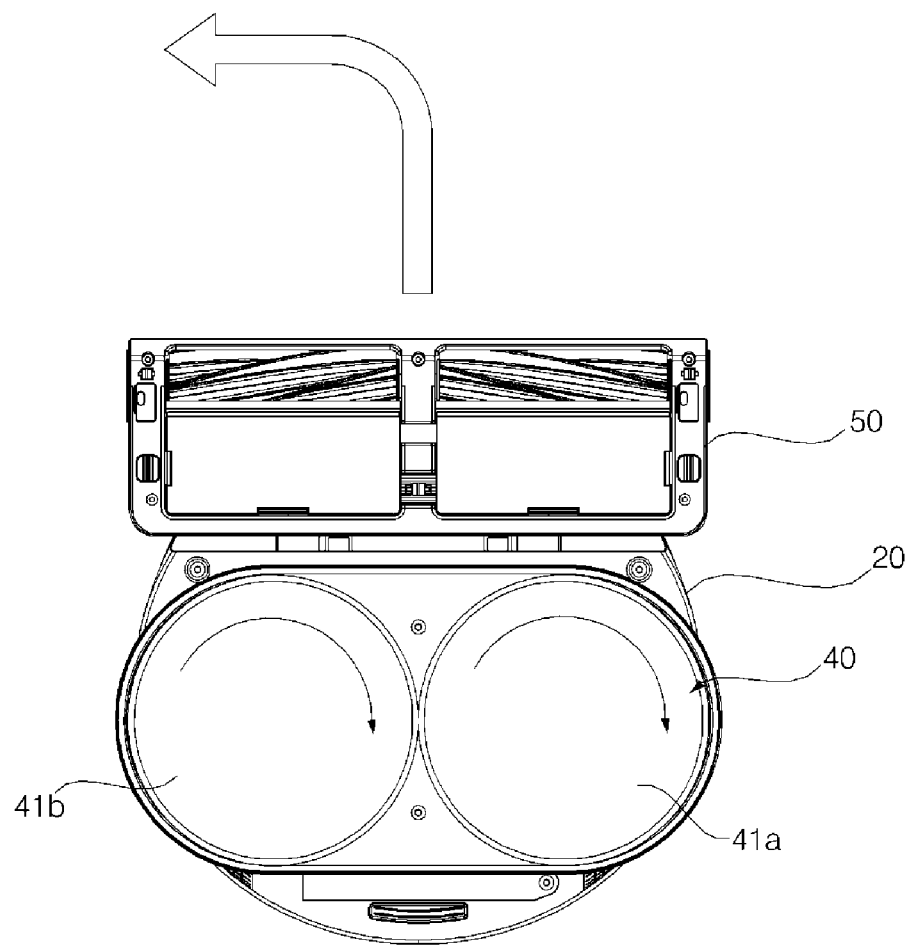
Figure 6C:
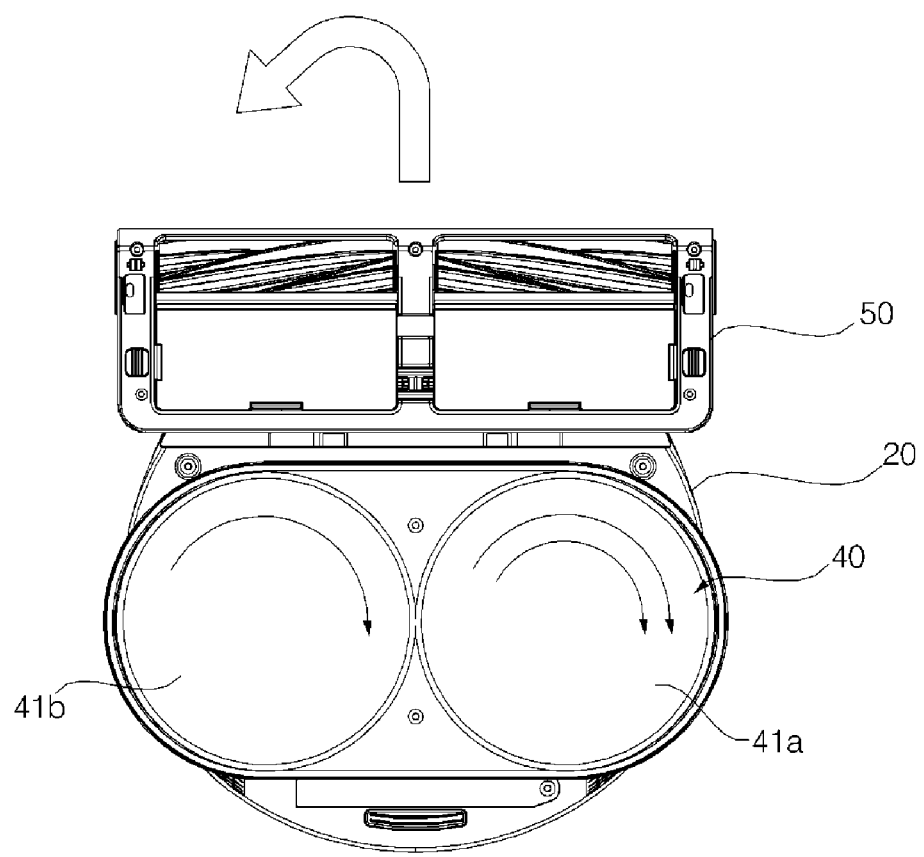

FIGS. 6A to 6C are reference views illustrating the rotation of the spin-mops during the travel of the robot cleaner according to the embodiment of the present disclosure. The robot cleaner according to this embodiment may include a pair of spin-mops 41*a* and 41*b*, and may move through the rotation of the spin-mops 41*a* and 41*b*. In order to control the travel of the robot cleaner, the controller 550 may separately manage the rotational directions or speeds of the spin-mops 41*a* and 41*b*.

Referring to FIG. 6A, the spin-mops 41*a* and 41*b* may rotate in opposite directions to move the robot cleaner straight. In this case, the rotational speeds of the spin-mops 41*a* and 41*b* are substantially identical to each other, but the rotational directions of the spin-mops 41*a* and 41*b* are different from each other. The rotational directions of the spin-mops 41*a* and 41*b* may be changed in order to move the robot cleaner forward or rearward.

In addition, referring to FIGS. 6B and 6C, the spin-mops 41*a* and 41*b* may rotate in the same direction to turn the robot cleaner. The rotational speeds of the spin-mops 41*a* and 41*b* may be changed so as to be different from each other such that the robot cleaner rotates without moving e.g., revolves, or moves along a curve. The ratio of the rotational speed of the spin-mop 41a to the rotational speed of the spin-mop 41b may be changed to adjust the radius of revolution of the robot cleaner.

In another example, the controller 550 may perform control such that the left spin-mop 41a and the right spin-mop 41b are rotated in opposite directions at different speeds in order to turn the robot cleaner. For example, the controller 550 may perform control such that the left spin-mop 41a and the right spin-mop 41b are rotated in the same direction at different speeds in order to turn the robot cleaner. In addition, the controller 550 may control the rotational directions and speeds of the spin-mops 41a and 41b such that the robot cleaner has various travel motions.

Alternatively, the controller 550 may combine the operations of the spin-mops 41a and 41b and the sweeping units 51a and 51b such that the robot cleaner has various travel motions. Consequently, the controller 500 may perform control such that the robot cleaner performs evasion travel in various manners in response to sensing of an obstacle by the obstacle sensor 511. The controller 500 may perform control such that the robot cleaner performs evasion travel differently based on the distance to the obstacle sensed by the obstacle sensor 511.

In addition, the sensor unit 510 may include a position sensor 512 for receiving an external identification signal to identify the position of the robot cleaner. For example, the position sensor 512 may be an ultra-wide band (UWB) sensor using a UWB signal. UWB is a technology of transmitting a signal using an ultra-wide frequency at low power within a short-distance range. UWB is suitable for use in an indoor space having therein an obstacle, such as a wall, since UWB exhibits good distance resolution and high transmissivity.

Meanwhile, the controller 550 may identify the position of the robot cleaner based on the signal received from the position sensor 512. The external identification signal is a signal that is transmitted by an external signal generator, such as a beacon. A plurality of signal generators may be provided so as to be spaced apart from each other. Consequently, the position sensor 512 may receive identification signals from signal generators positioned at different places.

The position sensor 512 may sense the position or direction of the robot cleaner based on information, such as the intensity, direction, and reception time of the identification signal received from the signal generator, and the comparison of information received at the previous position with information received at the current position. Additionally, the robot cleaner may detect the position of the robot cleaner in a space based on the distance relative to three or more signal generators, such as anchors or beacons, for specific identification signals, such as UWB or BLE.

Meanwhile, the sensor unit 510 may include an inertial measurement unit (IMU) sensor 513. The IMU sensor 513 may include a gyroscopic sensor (or gyro) sensor 513a, a geomagnetic sensor 513b, and an acceleration sensor 513c. Alternatively, the sensor unit 510 may include a gyro sensor 513a, a geomagnetic sensor 513b, and an acceleration sensor 513c.

The gyro sensor 513a may sense a predetermined reference direction. The geomagnetic sensor 513b may measure a heading angle (an azimuth). The acceleration sensor 513c may measure a change in speed. Consequently, the IMU sensor 513 may measure the movement speed, direction, gravity, and acceleration of the robot cleaner.

The gyro sensor 513a and the acceleration sensor 513c may be a three-axis sensor. Information collected by the gyro sensor 513a may be information about roll, pitch, and yaw. Information collected by the acceleration sensor 513c may be information about x-axis acceleration, y-axis acceleration, and z-axis acceleration.

The IMU sensor 513 may measure accelerations in the advancing direction, the transverse direction, and the height direction and roll, pitch, and yaw angular velocities. The controller 550 may integrate the accelerations and the angular velocities acquired by the IMU sensor 513 to calculate the speed and heading angle of the robot cleaner.

Consequently, the robot cleaner according to the embodiment of the present disclosure may have a compensation control structure capable of adjusting the output of the motor-driving units 551 and 552 depending on a change in the acceleration and the rotation angular velocity acquired by the IMU sensor 513 in order to change the RPM of the motors to thus control the motion of the robot cleaner. For example, the controller 550 may control the rotational speed of the left spin-mop 41a, the right spin-mop 41b, and the sweeping units 51 and 51b based on a change in the acceleration and the rotation angular velocity sensed by the IMU sensor 513.

In addition, the controller 550 may control the motors so as to compensate for the output of the motors using information sensed by the sensor unit 510, such as acceleration and speed. In addition, the controller 550 may identify the current travel state of the robot cleaner based on predetermined information sensed by the sensor unit 510, such as the heading angle of the robot cleaner.

Meanwhile, the sensor unit 510 may further include a cliff sensor 514 for sensing if there is a cliff in the floor within the traveling range of the robot cleaner. The cliff sensor 514 may be the cliff sensor 23 shown in FIG. 1. The sensor unit 510 may include multiple cliff sensors 514 located at different location on the bottom of the robot cleaner.

Figure 7A:
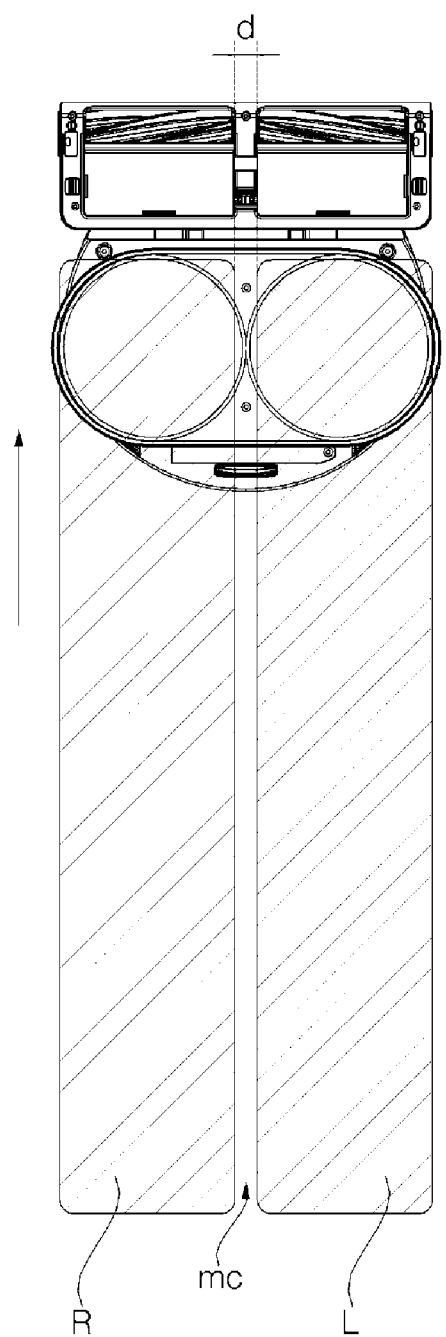
FIG. 7A is a reference view illustrating the occurrence of an uncleaned region.

FIG. 7A is a reference view illustrating the occurrence of an uncleaned region in a robot cleaner with spin mops. A zigzag-pattern travel of a conventional robot cleaner may effectively eliminate uncleaned regions. In a robot cleaner that is driven through spin-mops, however, an uncleaned region is left behind in the central part of the robot cleaner, and as a result, the conventional zigzag-pattern travel cannot be used without change to eliminate uncleaned regions.

Referring to FIG. 7A, in a robot cleaner including spin-mops, an uncleaned region mc due to the spin-mops may occur. Referring to FIG. 7A, in the robot cleaner that travels while performing cleaning according to the rotation of the spin-mops, the left spin-mop 41a and the right spin-mop 41b move along the floor in the state of being in contact with the floor. At this time, an uncleaned region mc having a predetermined width d may occur between the movement trajectory L of the left spin-mop 41a and the movement trajectory R of the right spin-mop 41b.

If the robot cleaner is designed such that the left spin-mop 41a and the right spin-mop 41b, which are independent rotational bodies, are in contact with each other, the left spin-mop 41a and the right spin-mop 41b may interfere with each other. For this reason, it is necessary to provide a margin necessary for preventing such interference. As a result, a margin region is formed between the left spin-mop 41a and the right spin-mop 41b. Due to this margin region, an uncleaned region mc, which has not been cleaned, may occur even when the robot cleaner travels straight.

In addition, the spin-mops 41a and 41b may be inclined such that the robot cleaner travels using the spin-mops 41a and 41b. In this case, an uncleaned region mc may occur at the central part of the robot cleaner, at which the frictional force is relatively low. In addition, an uncleaned region mc, which occurs when the robot cleaner travels straight, may repeatedly occur when the robot cleaner travels in a zigzag pattern, in which the robot cleaner travels straight in a reciprocating fashion. In order to improve cleaning performance, the robot cleaner may use a traveling method capable of preventing the occurrence of an uncleaned region mc while a robot cleaner that performs a mopping operation travels according to a conventional intuitive travel motion.

Figure 7B:
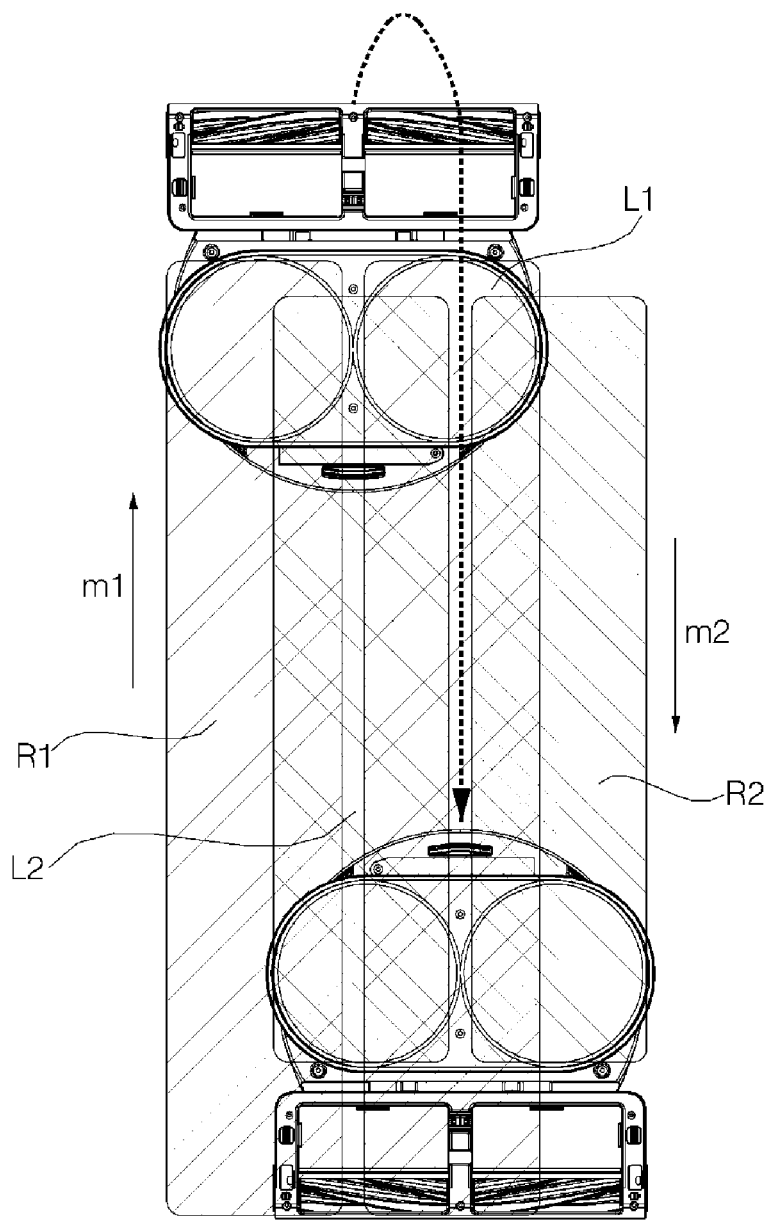
FIG. 7B is a reference view illustrating a method of controlling the travel of the robot cleaner according to the embodiment of the present disclosure in order to prevent the occurrence of an uncleaned region.

FIG. 7B is a reference view illustrating a method of controlling the travel of the robot cleaner according to the embodiment of the present disclosure. Referring to FIG. 7B, the controller 550 may perform control such that the robot cleaner travels in a zigzag pattern including a first travel segment m1, in which the robot cleaner travels straight in a first direction, and a second travel segment m2, in which the robot cleaner travels straight in a second direction, which is opposite the first direction.

As shown in FIG. 7B, the controller may perform control such that the direction in which the robot cleaner returns is set in order to cover an uncleaned region and then travels in the zigzag pattern. That is, the controller 550 may perform control such that the movement trajectory L2 of the left spin-mop 41a or the movement trajectory R2 of the right spin-mop 41b during the second travel m2 overlaps the movement trajectory L1 of the left spin-mop 41a and the movement trajectory R1 of the right spin-mop 41b during the first travel m1.

The controller 550 may perform control such that, based on the direction in which the robot cleaner turns for returning during the zigzag-pattern travel of the robot cleaner, the movement trajectory of one of the spin-mops 41a and 41b overlaps both the movement trajectories L1 and R1 of the spin-mops 41a and 41b during the previous straight travel.

FIG. 7B shows the case in which the robot cleaner performs the first travel m1 in the upward direction and then performs the second travel m2 in the downward direction while turning to the right or after turning to the right. In this case, the controller 550 may perform control such that the movement trajectory L2 of the left spin-mop 41a during the second travel m2 overlaps both the movement trajectories L1 and R1 of the spin-mops 41a and 41b during the previous straight travel m1. Consequently, an uncleaned region occurring during the first straight travel may be cleaned during the second straight travel, thereby preventing the occurrence of an uncleaned region.

FIGS. 8 to 14 are reference views illustrating various methods of controlling the travel of the robot cleaner according to the embodiment of the present disclosure. Referring to section (a) of FIG. 8, when the robot cleaner performs a first travel m1, during which the robot cleaner travels upward (e.g., in a first direction) straight, an uncleaned region mc1 having a predetermined width d may occur between the movement trajectory L1 of the left spin-mop 41a and the movement trajectory R1 of the right spin-mop 41b.

Figure 8:
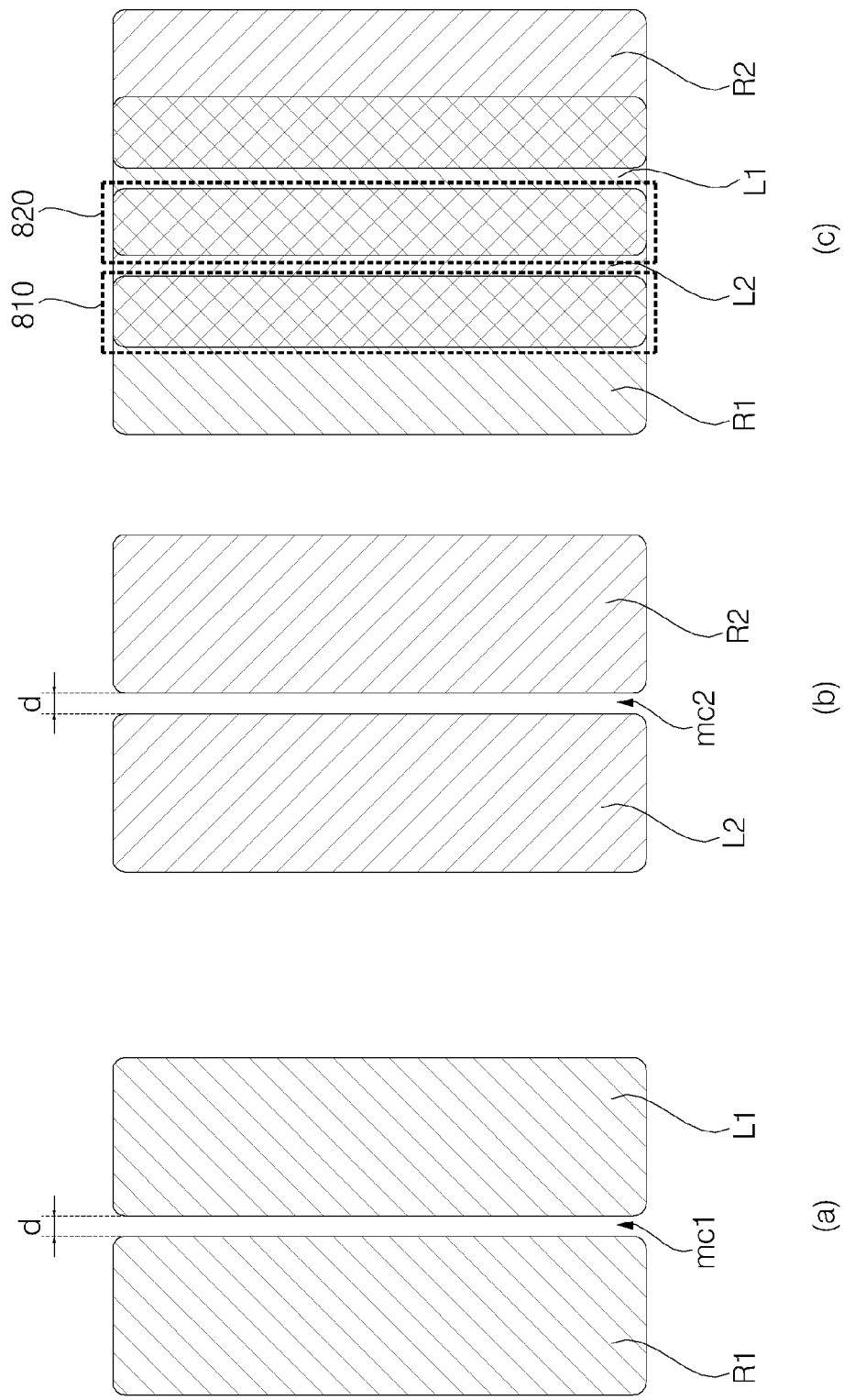
FIGS. 8 to 14 are reference views illustrating various methods of controlling the travel of the robot cleaner according to the embodiment of the present disclosure.

Referring to section (b) of FIG. 8, when the robot cleaner performs a second travel m2, during which the robot cleaner travels downward (e.g., in a second direction that is substantially opposite to the first direction) straight, an uncleaned region mc2 having a predetermined width d may occur between the movement trajectory L2 of the left spin-mop 41a and the movement trajectory R2 of the right spin-mop 41b.

However, the first travel m1, during which the robot cleaner travels upward straight, and the second travel m2, during which the robot cleaner travels downward straight, may be controlled such that overlapping sections occur appropriately in order to remove the uncleaned regions. Referring to section (c) of FIG. 8, the controller 550 may perform control such that the movement trajectory L2 of the left spin-mop 41a during the second travel m2 overlaps both the movement trajectories L1 and R1 of the spin-mops 41a and 41b during the previous straight travel m1 at overlapping sections 810 and 820 in order to remove the uncleaned regions.

Consequently, it is possible to effectively prevent the occurrence of uncleaned regions while the robot cleaner travels according to a conventional intuitive zigzag-pattern travel motion, with which users are most familiar. In addition, straight travel is more frequently used than S-pattern travel, thereby increasing cleaning speed and decreasing cleaning time.

Meanwhile, the controller 550 may perform control such that the first travel m1 and the second travel m2 are repeatedly performed in sequence. That is, the controller 550 may perform control such that, after the first travel m1 in a first direction and the second travel m2 in a direction opposite the first direction, the first travel m1 and the second travel m2 are sequentially performed, and then the first travel m1 and the second travel m2 are sequentially performed again.

In addition, the controller 550 may perform control such that a third travel, during which the robot cleaner travels straight in the first direction, is performed after the second travel m2. In this case, the controller 550 may perform control such that the movement trajectory of the left spin-mop or the right spin-mop during the third travel overlaps the movement trajectory of the left spin-mop and the movement trajectory of the right spin-mop during the second travel.

Figure 9:
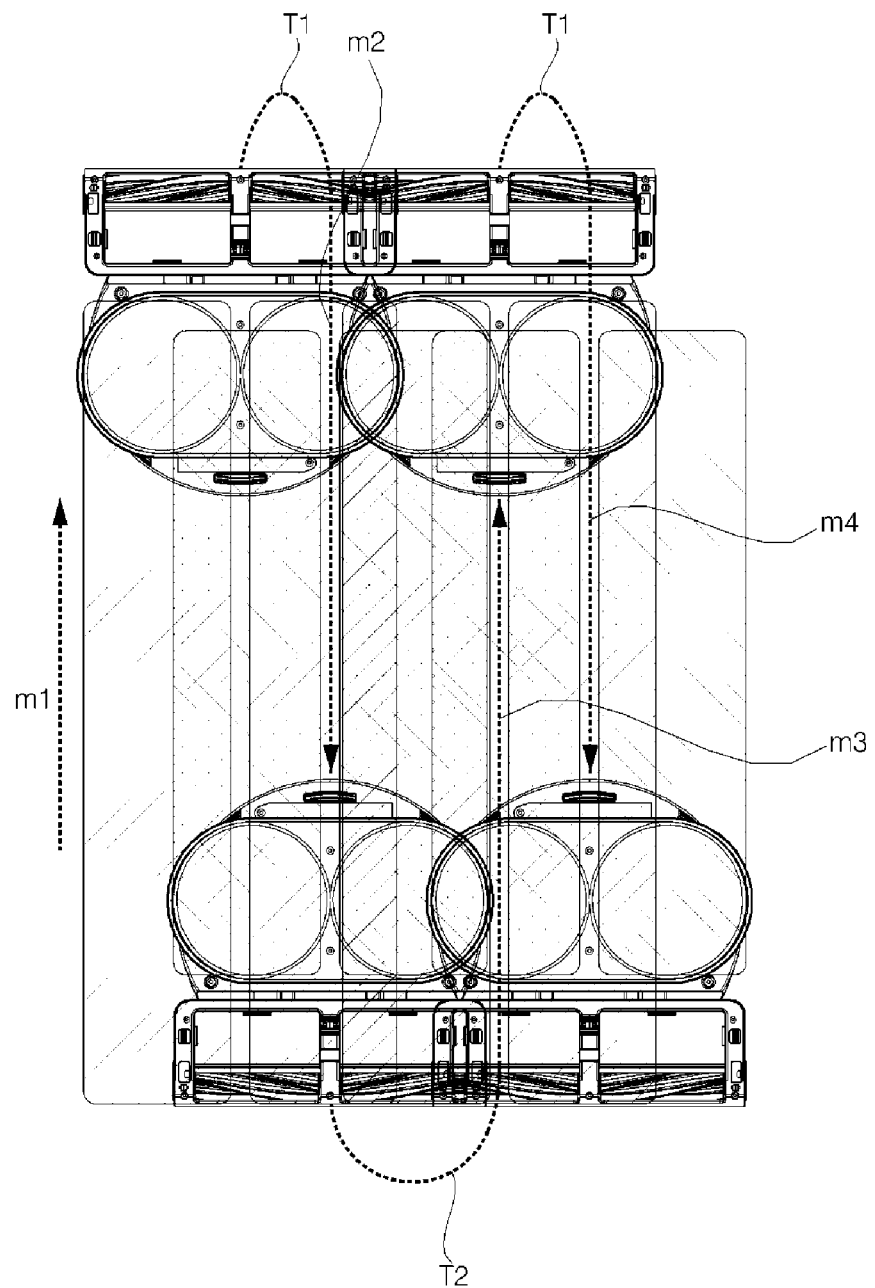

Referring to FIG. 9, when the third travel m3, during which the robot cleaner travels straight in the first direction, is performed after the first and second travels m1 and m2 having predetermined overlapping sections, the robot cleaner may travel such that overlapping sections occur during the second and third travels m2 and m3, in the same manner as during the first and second travels m1 and m2.

The controller 550 may perform control such that the movement trajectory of the left spin-mop or the right spin-mop during the third travel m3 overlaps the movement trajectory of the left spin-mop and the movement trajectory of the right spin-mop during the second travel m2. In addition, the next travel m4 may be performed so as to overlap the third travel m3 in the same manner.

Similarly, the controller 550 may perform control such that the movement trajectory of one of the left and right spin-mops during an (N+1)-th straight travel overlaps both the movement trajectory of the left spin-mop and the movement trajectory of the right spin-mop during an N-th straight travel. That is, the controller 550 may perform control such that the robot cleaner continues to travel in an overlapping zigzag pattern including overlapping sections that are formed during straight travels performed in a zigzag pattern.

Meanwhile, the radius of a turning travel T1 for determining the direction in which the robot cleaner is to return after the first travel m1 may be less than the radius of a turning travel T2 for determining the direction in which the robot cleaner is to return after the second travel m2. That is, when the robot cleaner travels in an overlapping zigzag pattern, turning of the robot cleaner after traveling in a predetermined direction may be performed in a radius that is smaller than that of turning of the robot cleaner after traveling in an opposite direction, whereby the cleaning ranges may be different from each other during two straight travels that form a pair.

Figure 10:
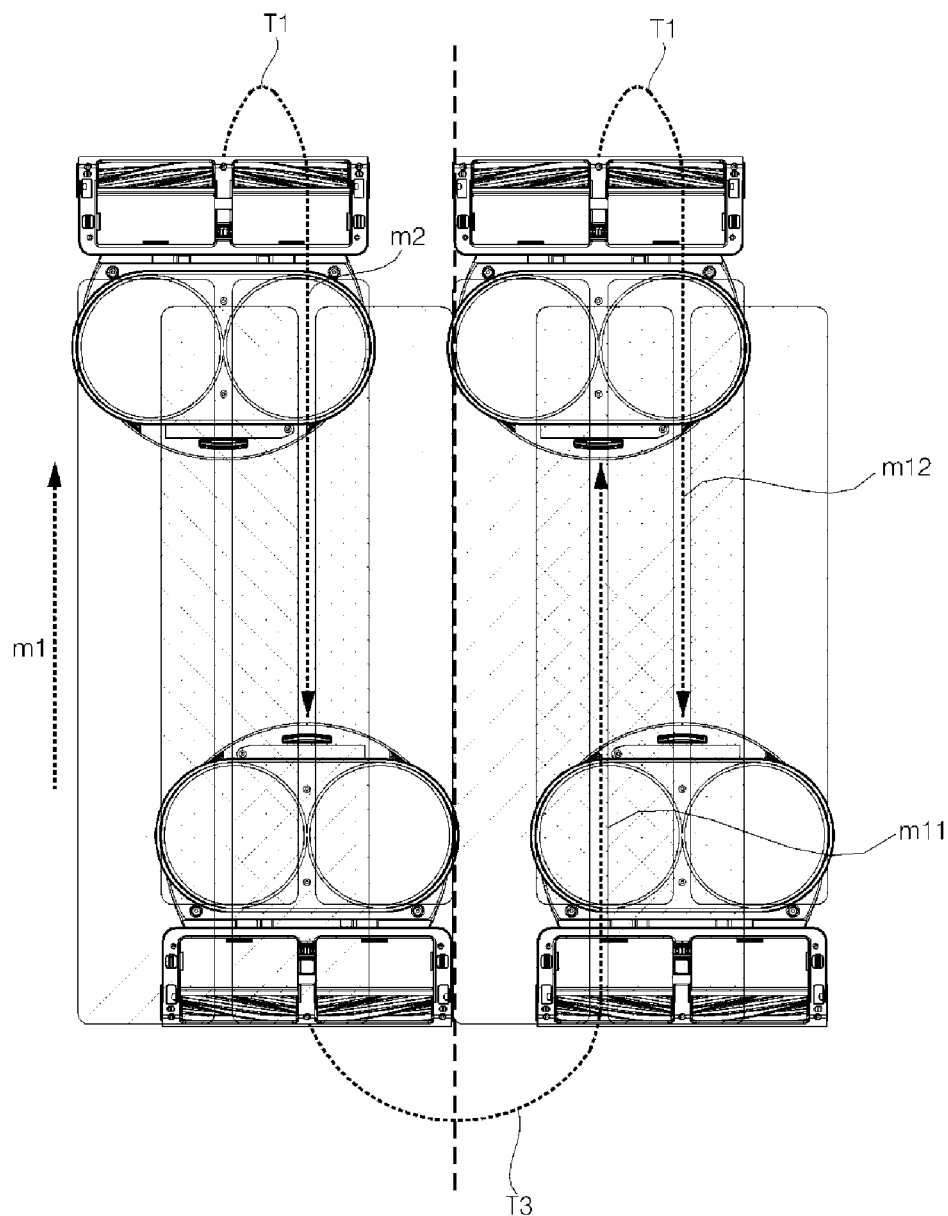

Alternatively, the controller 550 may perform control such that, after the first and second travels m1 and m2 that have predetermined overlapping sections, the next travel is performed in another pattern. Referring to FIG. 10 and section (a) of FIG. 11, the controller 550 may perform control such that a fourth travel m11, in which the robot travels straight in the first direction, is performed after the second travel m2. In this case, the movement trajectory 1120 of the left spin-mop 41*a* or the right spin-mop 41*b* during the fourth travel m11 does not overlap the movement trajectory of the left spin-mop or the movement trajectory 1110 of the right spin-mop during the second travel.

In addition, the controller 550 may perform control such that the next travel m12, which forms a pair with the fourth travel m11, in which the robot travels straight in the first direction, has overlapping sections in the same manner as the first and second travels m1 and m2. In this embodiment, it is possible to minimize an overlapping region during zigzag cleaning, which may occur when the overlapping zigzag motion described with reference to FIG. 9 is performed.

Consequently, it is possible to further increase the cleaning speed and travel speed while preventing the occurrence of an uncleaned region. Meanwhile, even in this embodiment, the radius of a turning travel T1 for determining the direction in which the robot cleaner is to return after the first travel m1 may be less than the radius of a turning travel T3 for determining the direction in which the robot cleaner is to perform the returning travel m11 after the second travel m2. That is, when the robot cleaner travels in an overlapping zigzag pattern, turning of the robot cleaner after traveling in a predetermined direction may be performed so as to be smaller than turning of the robot cleaner after traveling in an opposite direction, whereby the cleaning ranges may be different from each other during two straight travels that form a pair. In addition, in the embodiment shown in FIG. 10, during the turning travel T3 in a predetermined direction, the robot cleaner may turn with a greater radius than during the turning travel T2 in the embodiment of FIG. 9, thereby achieving a further increase in speed.

Figure 11:
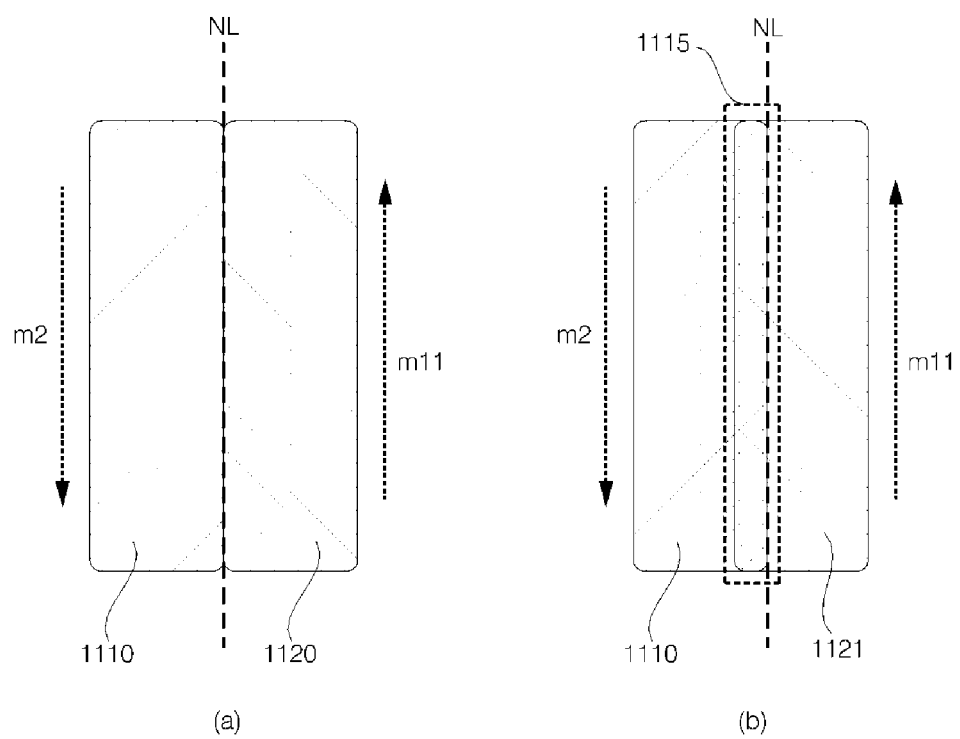

Meanwhile, referring to section (a) of FIG. 11, the movement trajectory 1120 of the left spin-mop or the right spin-mop during the fourth travel m11 and the movement trajectory of the left spin-mop or the movement trajectory 1110 of the right spin-mop during the second travel may be divided from each other on the basis of a reference line NL, whereby no overlapping section occurs. However, the robot cleaner is not ideally controlled depending on the travel environment and the state of the robot cleaner, and therefore an uncleaned region may occur between the movement trajectories 1110 and 1120.

To prevent the occurrence of an uncleaned region, a predetermined design margin may be set. Referring to section (b) of FIG. 11, the controller 550 may perform control such that the movement trajectory 1121 of one of the left and right spin-mops during the fourth travel m11 overlaps the movement trajectory 1110 of one of the left and right spin-mops during the second travel m2 at an overlapping section 1115. That is, the controller 550 may control the fourth travel m11 so as to overlap the outermost trajectory 1110 during the second travel m2. In addition, a straight travel following the fourth travel m11 may overlap both the movement trajectory of the left spin-mop and the movement trajectory 1110 of the right spin-mop during the fourth travel m11, like the relationship between the first and second travels m1 and m2.

The controller 550 may perform control such that the above travel pattern is repeatedly performed. The controller 550 may perform control to repeatedly perform a travel pattern in which an N-th straight travel (e.g. a first travel m1), an (N+1)-th straight travel (e.g. a second travel m2), an (N+2)-th straight travel (e.g. a fourth travel m11), and an (N+3)-th straight travel are sequentially performed.

In this case, the controller 550 may perform control such that the movement trajectory of one of the left and right spin-mops during the (N+1)-th straight travel overlaps both the movement trajectory of the left spin-mop and the movement trajectory of the right spin-mop during the N-th straight travel, such that the movement trajectory of one of the left and right spin-mops during the (N+2)-th straight travel overlaps the movement trajectory of one of the left and right spin-mops during the (N+1)-th straight travel, and such that the movement trajectory of one of the left and right spin-mops during the (N+3)-th straight travel overlaps both the movement trajectory of the left spin-mop and the movement trajectory of the right spin-mop during the (N+2)-th straight travel.

Consequently, it is possible to prevent the occurrence of an uncleaned region while increasing the cleaning speed. The robot cleaner according to the embodiment of the present disclosure may not perform direction-change turning after stoppage but may perform a direction-change motion in order to perform direction change, which is repeatedly performed during a zigzag-pattern travel.

Figure 12:
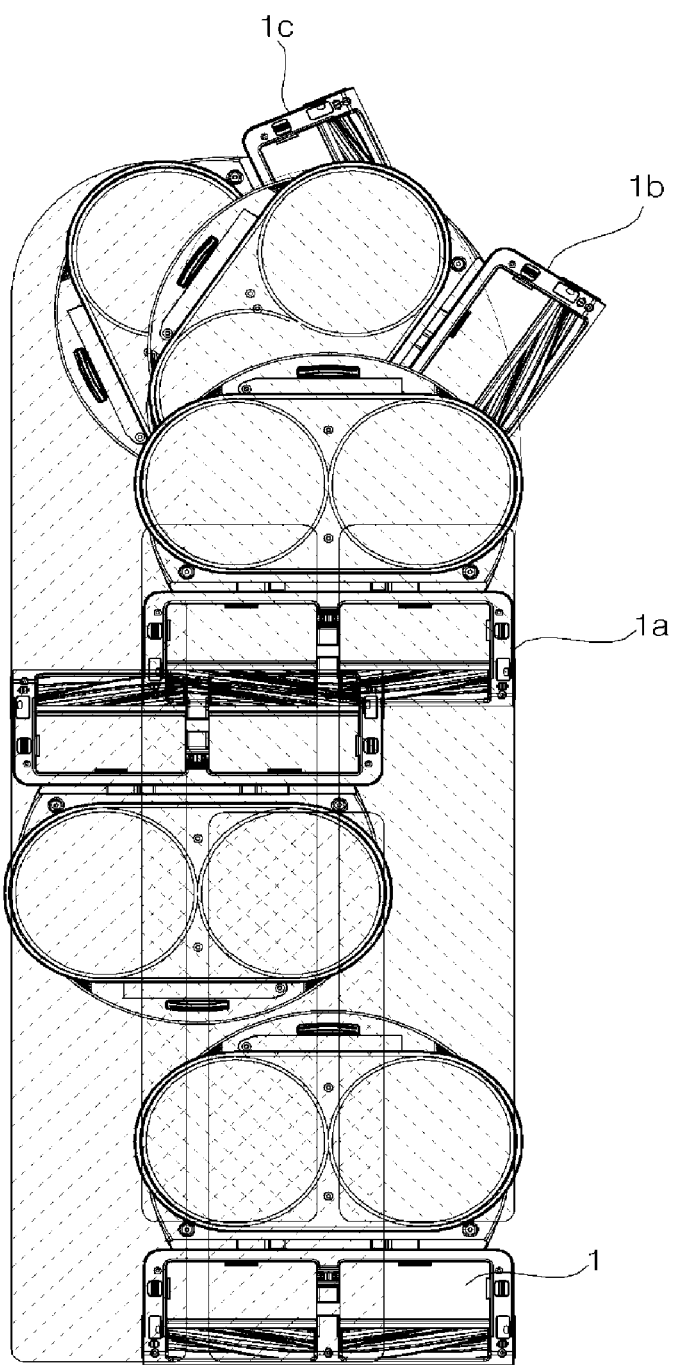

Referring to FIG. 12, when the direction of the robot cleaner 1 is changed during a zigzag-pattern travel, the robot cleaner slides in the order of 1*a*→1*b*→1*c* without stopping a motion according to sliding of the spin-mops 41*a* and 41*b* on the floor in order to perform distance and direction adjustment.

In the present disclosure, the robot cleaner may travel according to various motions. For example, even when the robot cleaner turns in the same direction, the rotational radius and speed of the robot cleaner may be variously changed, whereby the robot cleaner may travel variously. For example, as described with reference to FIGS. 6A to 6C, the controller 550 may perform control such that the left spin-mop 41*a* and the right spin-mop 41*b* are rotated in the same direction at different speeds in order to turn the robot cleaner. That is, the left spin-mop 41*a* and the right spin-mop 41*b* may be rotated in the same direction in order to set the rotational direction of the robot cleaner, and the left spin-mop 41*a* and the right spin-mop 41*b* may be rotated at different speeds in order to set the rotational direction of the robot cleaner.

Alternatively, the controller 550 may perform control such that the left spin-mop 41*a* and the right spin-mop 41*b* are rotated in opposite directions at different speeds in order to turn the robot cleaner. That is, the robot cleaner may turn while the left spin-mop 41*a* and the right spin-mop 41*b* are rotated in opposite directions.

Figure 13:
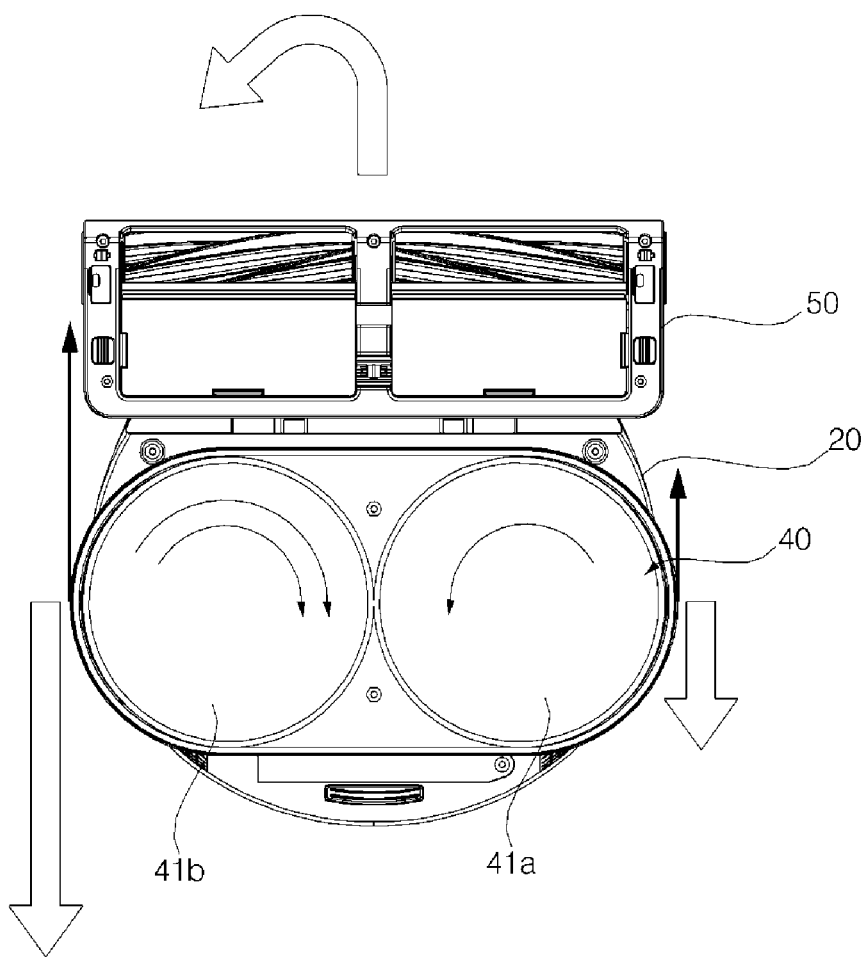

Referring to FIG. 13, the robot cleaner may turn to the right while the left spin-mop 41*a* and the right spin-mop 41*b* are rotated in opposite directions, i.e. in the inward directions when viewed from below. The controller 550 may perform control such that, in order to turn the robot cleaner, the left spin-mop 41*a* is rotated in the counterclockwise direction at a speed lower than the speed of the right spin-mop 41b in the state in which the right spin-mop 41b is rotated in the clockwise direction when viewed from below.

Referring to FIG. 13, the greatest frictional force generated between the left spin-mop 41a and the floor when the left spin-mop 41a is rotated is applied to a point on the lower surface of the left spin-mop 41a that is located on the right side of the center of rotation of the left spin-mop 41a. As a greater load may be transmitted to the point on the lower surface of the left spin-mop 41a than to other points on the lower surface of the left spin-mop 41a, the greatest frictional force may be generated at the point. In this embodiment, the point is located on the right side of the center of rotation. Alternatively, the point may be located in front of the right side of the center of rotation or at the rear of the right side of the center of rotation.

Referring to FIG. 13, the greatest frictional force generated between the right spin-mop 41b and the floor when the right spin-mop 41b is rotated is applied to a point on the lower surface of the right spin-mop 41b that is located on the left side of the center of rotation of the right spin-mop 41b. As a greater load may be transmitted to the point on the lower surface of the right spin-mop 41b than to other points on the lower surface of the right spin-mop 41b, the greatest frictional force may be generated at the point. In this embodiment, the point is located on the left side of the center of rotation. Alternatively, the point may be located in front of the left side of the center of rotation or behind the left side of the center of rotation.

The robot cleaner travels due to the frictional force generated between the spin-mops 41a and 41b and the floor. The spin-mops 41a and 41b may generate a forward-movement frictional force for moving the main body 20 forward or a rearward-movement frictional force for moving the main body 20 rearward. The spin-mops 41a and 41b may generate a leftward-moment frictional force for turning the main body 20 to the left or a rightward-moment frictional force for turning the main body 20 to the right. The spin-mops 41a and 41b may generate a combination of one of the forward-movement and rearward-movement frictional forces and one of the leftward-moment and rightward-moment frictional forces.

In order to generate the forward-movement frictional force, the left spin-mop 41a may be rotated in a first forward direction at a predetermined rpm, and the right spin-mop 41b may be rotated in a second forward direction at the predetermined rpm. In order to generate the rearward-movement frictional force, the left spin-mop 41a may be rotated in a first reverse direction at a predetermined rpm, and the right spin-mop 41b may be rotated in a second reverse direction at the predetermined rpm.

In order to generate the rightward-moment frictional force, the left spin-mop 41a may be rotated in the first forward direction at a predetermined rpm, and the right spin-mop 41b may be rotated in the second reverse direction, may be stopped without being rotated, or may be rotated in the second forward direction at an rpm lower than the predetermined rpm. In order to generate the leftward-moment frictional force, the right spin-mop 41b may be rotated in the second forward direction at a predetermined rpm, and the left spin-mop 41a may be rotated in the first reverse direction, may be stopped without being rotated, or may be rotated in the first forward direction at an rpm lower than the predetermined rpm.

Figure 14:
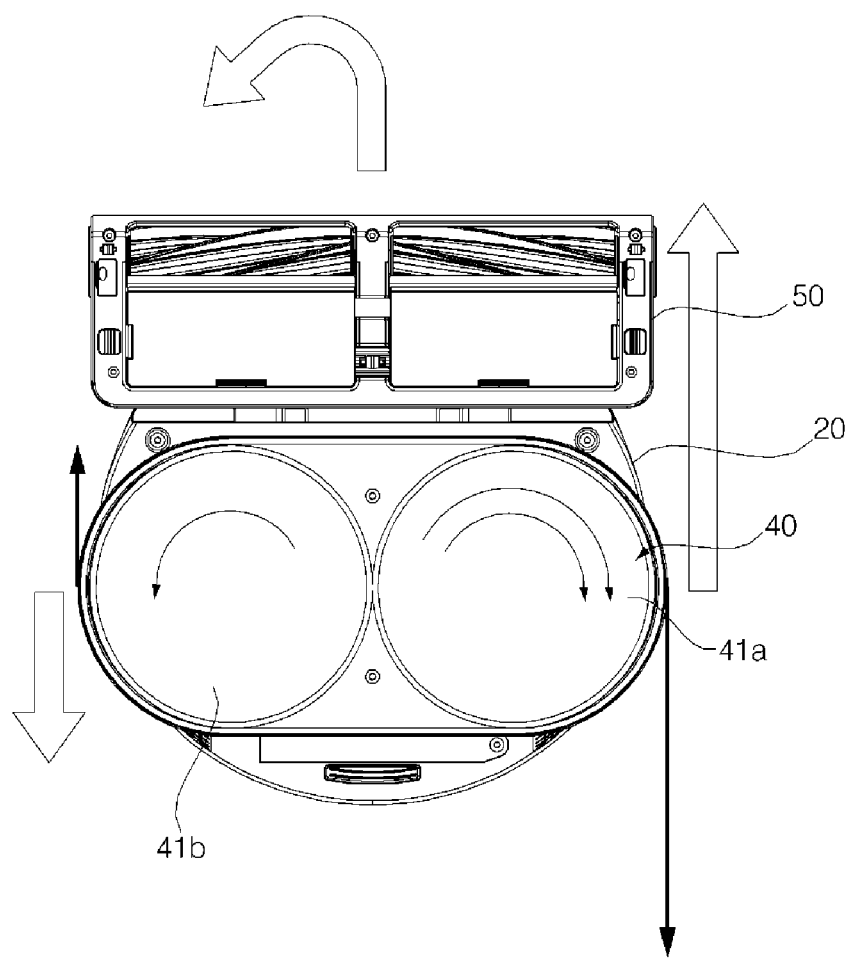

Referring to FIG. 14, the robot cleaner may turn to the right while the left spin-mop 41a and the right spin-mop 41b are rotated in opposite directions, i.e. in the outward directions when viewed from below. The controller 550 may perform control such that, in order to turn the robot cleaner, the left spin-mop 41a is rotated in the clockwise direction at a speed higher than the speed of the right spin-mop 41b in the state in which the right spin-mop 41b is rotated in the counterclockwise direction when viewed from below.

In the present disclosure, the two spin-mops 41a and 41b are independently driven, whereby the freedom of travel speed and motion is high. In addition, according to the present disclosure, it is possible to rapidly and effectively clean an uncleaned region through an overlapping zigzag motion while maintaining a conventional intuitive zigzag-pattern travel motion. In addition, according to the present disclosure, it is possible to reduce cleaning time through continuous travel during a zigzag motion using sliding between the spin-mops 41a and 41b and the floor.

As is apparent from the above description, the robot cleaner is capable of traveling while completely cleaning a floor without allowing an uncleaned region to remain. In addition, the robot cleaner has an increased travel speed and cleaning speed and improved cleaning performance and a method of controlling the same. In addition, the robot cleaner is capable of performing a travel appropriate for the circumstances using various travel motions. In addition, the robot cleaner is capable of performing either wet cleaning or dry cleaning as needed. Various other aspects have been directly disclosed or implied in the detailed description of the disclosure.

The robot cleaner according to the present disclosure and the method of controlling the same are not limitedly applied to the constructions and methods of the embodiments as previously described, and all or some of the embodiments may be selectively combined to achieve various modifications.

An aspect of the present disclosure provides a robot cleaner capable of traveling while completely cleaning a floor without allowing an uncleaned region to remain. Another aspect of the present disclosure provides a robot cleaner having increased travel speed and cleaning speed and improved cleaning performance and a method of controlling the same. Another aspect of the present disclosure provides a robot cleaner capable of performing a travel appropriate for the circumstances using various travel motions. A further aspect of the present disclosure provides a robot cleaner capable of performing either wet cleaning or dry cleaning as needed.

In accordance with the present disclosure, the above and other aspects can be accomplished by the provision of a robot cleaner including a first cleaning module including a left spin-mop and a right spin-mop configured to contact a floor while rotating in a clockwise direction or in a counterclockwise direction when viewed from above and a controller for performing control such that, when the robot cleaner travels in a zigzag pattern including a first travel, during which the robot cleaner travels straight in a first direction, and a second travel, during which the robot cleaner travels straight in a second direction, which is opposite the first direction, the movement trajectory of the left spin-mop or the right spin-mop during the second travel overlaps the movement trajectory of the left spin-mop and a movement trajectory of the right spin-mop during the first travel, whereby the robot cleaner is capable of traveling rapidly while completely cleaning the floor without allowing an uncleaned region to remain.

It will be apparent that, although the preferred embodiments have been shown and described above, the present specification is not limited to the above-described specific embodiments, and various modifications and variations can be made by those skilled in the art to which the present disclosure pertains without departing from the gist of the appended claims. Thus, it is intended that the modifications and variations should not be understood independently of the technical spirit or prospect of the present specification.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot cleaner comprising:
   a first spin-mop and a second spin-mop that contact a floor while rotating in a clockwise direction or in a counter-clockwise direction when viewed from above; and
   a controller that manages respective rotational directions and rotational speeds of the first spin-mop and the second spin-mop to move the robot cleaner such that:
   the robot cleaner travels in a zigzag pattern that includes a first travel during which the robot cleaner moves in a first direction, and a second travel during which the robot cleaner moves in a second direction which is opposite to the first direction, and
   a first region of the floor over which one of the first spin-mop or the second spin-mop moves during the second travel overlaps a second region of the floor over which the first spin-mop moves during the first travel and a third region of the floor over which the second spin-mop moves during the first travel.

2. The robot cleaner according to claim 1, wherein the controller selectively changes the rotational directions and speeds of the first spin-mop and the second spin-mop to control a turning direction and a turning radius of the robot cleaner.

3. The robot cleaner according to claim 1, wherein an uncleaned region is present between the second region of the floor over which the first spin-mop moves during the first travel and the third region of the floor over which the second spin-mop moves during the first travel, and the first region of the floor over which the one of the first spin-mop or the second spin-mop moves during the second travel passes over the uncleaned region.

4. The robot cleaner according to claim 1, wherein the controller further manages the respective rotational directions and rotational speeds of the first spin-mop and the second spin-mop such that:
   the zigzag pattern includes a third travel during which the robot cleaner travels in the first direction after the second travel, and
   a fourth region of the floor over which the first spin-mop or the second spin-mop moves during the third travel overlaps the first region of the floor over which one of the first spin-mop or the second spin mop moves during the second travel and a fifth region of the floor over which another one of the first spin-mop or the second spin-mop moves during the second travel.

5. The robot cleaner according to claim 4, wherein the controller further manages the respective rotational directions and rotational speeds of the first spin-mop and the second spin-mop such a region of the floor over which one of the first or second spin-mops moves during an (N+1)-th straight travel overlaps both regions of the floors over which the first spin-mop and the second spin-mop move during an N-th straight travel.

6. The robot cleaner according to claim 1, wherein the controller manages the respective rotational directions and rotational speeds of the first spin-mop and the second spin-mop such that the first travel and the second travel are repeatedly performed in sequence.

7. The robot cleaner according to claim 1, wherein the controller further manages the respective rotational directions and rotational speeds of the first spin-mop and the second spin-mop such that:
the zigzag pattern includes a fourth travel in which the robot cleaner travels in the first direction after the second travel, and
a fourth region of the floor over which the first spin mop or the second spin-mop moves during the fourth travel overlaps one of the second region over which the first mop moves during the second travel or the third region over which the second spin-mop moves during the second travel.

8. The robot cleaner according to claim 7, wherein the controller further manages the respective rotational directions and rotational speeds of the first spin-mop and the second spin-mop such that:
the robot cleaner repeatedly performs a travel pattern in which an N-th straight travel, an (N+1)-th straight travel, an (N+2)-th straight travel, and an (N+3)-th straight travel are sequentially performed,
a region of the floor over which one of the first or second spin-mops moves during the (N+1)-th straight travel overlaps both regions of the floor over which the first spin-mop and the second spin-mop move during the N-th straight travel,
a region of the floor over which one of the first or second spin-mops moves during the (N+2)-th straight travel overlaps a region of the floor over which one of the first and second spin-mops moves during the (N+1)-th straight travel, and
a region of the floor over which one of the first or second spin-mops moves during the (N+3)-th straight travel overlaps both regions of the floor over which the first spin-mop and the second spin-mop move during the (N+2)-th straight travel.

9. The robot cleaner according to claim 1, wherein the controller manages the first spin-mop and the second spin-mop such that the first spin-mop and the second spin-mop are rotated in opposite directions at different speeds to turn the robot cleaner.

10. The robot cleaner according to claim 1, wherein the controller manages the first spin-mop and the second spin-mop such that the first spin-mop and the second spin-mop are rotated in a common rotational direction at different speeds to turn the robot cleaner.

11. The robot cleaner according to claim 1, further comprising a water supply that supplies water to the first spin-mop and the second spin-mop.

12. The robot cleaner according to claim 1, wherein the first spin-mop and the second spin-mop are included in a first cleaning module, and wherein the robot cleaner further comprises a second cleaning module spaced apart from the first spin-mop and the second spin-mop in a forward direction or a rearward direction.

13. The robot cleaner according to claim 12, wherein the second cleaning module collects foreign matter from the floor.

14. The robot cleaner according to claim 13, wherein the second cleaning module includes:
sweeping rollers that rotate to contact the floor and introduce foreign matter on the floor into the second cleaning module.

15. The robot cleaner according to claim 1, wherein the first spin-mop and the second spin-mop are inclined upward toward a center of the robot cleaner.

16. A robot cleaner comprising:
a first spin-mop and a second spin-mop that contact a floor while rotating; and
a controller that manages respective rotational directions and rotational speeds of the first spin-mop and the second spin-mop to move the robot cleaner such that:
the robot cleaner travels in a zigzag pattern that includes a first travel during which the robot cleaner moves in a first direction, and a second travel during which the robot cleaner moves in a second direction which is opposite to the first direction,
an uncleaned region is present between regions of the floor over which the first spin-mop and the second spin-mop move during the first travel, and
one of the first spin-mop or the second spin-mop moves over the uncleaned region during the second travel.

17. The robot cleaner according to claim 16, wherein the controller further manages the respective rotational directions and rotational speeds of the first spin-mop and the second spin-mop such that:
the zigzag pattern includes a third travel during which the robot cleaner travels in the first direction after the second travel, and
one of the first spin-mop or the second spin-mop moves during the third travel to overlap regions of the floor over which the first spin-mop and the second spin-mop move during the second travel.

18. The robot cleaner according to claim 17, wherein the controller further manages the respective rotational directions and rotational speeds of the first spin-mop and the second spin-mop such a region of the floor over which one of the first or second spin-mops moves during an (N+1)-th straight travel overlaps both regions of the floors over which the first spin-mop and the second spin-mop move during an N-th straight travel.

19. The robot cleaner according to claim 16, wherein the controller manages the first spin-mop and the second spin-mop such that the first spin-mop and the second spin-mop are rotated in opposite directions at different speeds or are rotated in a common rotational direction at different speeds to turn the robot cleaner.

20. The robot cleaner according to claim 16, further comprising a second cleaning module spaced apart from the first spin-mop and the second spin-mop, the second cleaning module including one or more sweeping rollers that rotate to contact the floor and collect foreign matter on the floor.

* * * * *